(12) United States Patent
Tsui et al.

(10) Patent No.: US 12,142,963 B2
(45) Date of Patent: Nov. 12, 2024

(54) CASCADED POWER AND SIGNAL PROCESSING BLOCK SYSTEMS AND METHODS THEREOF

(71) Applicant: Katerly Industrial Co. Ltd., Hong Kong (CN)

(72) Inventors: Ho Yuen Tsui, Hong Kong (CN); Hiu Ming Tsui, Hong Kong (CN)

(73) Assignee: Katerly Industrial Co. Ltd., Hong Kong (CN)

( * ) Notice: Subject to any disclaimer, the term of this patent is extended or adjusted under 35 U.S.C. 154(b) by 124 days.

(21) Appl. No.: 17/938,680

(22) Filed: Oct. 7, 2022

(65) Prior Publication Data

US 2024/0120768 A1    Apr. 11, 2024

(51) Int. Cl.
*H02J 9/06*    (2006.01)
*H02J 13/00*    (2006.01)

(52) U.S. Cl.
CPC ........ *H02J 9/062* (2013.01); *H02J 13/00006* (2020.01)

(58) Field of Classification Search
USPC ......................................................... 446/91
See application file for complete search history.

(56) References Cited

U.S. PATENT DOCUMENTS

| | | | |
|---|---|---|---|
| 7,555,658 B2 | 6/2009 | Vahid et al. | |
| 8,257,157 B2 * | 9/2012 | Polchin | A63F 13/24 |
| | | | 463/9 |
| 8,704,654 B1 * | 4/2014 | Krasowski | H04B 3/548 |
| | | | 455/21 |

(Continued)

FOREIGN PATENT DOCUMENTS

| | | |
|---|---|---|
| CN | 102302854 A | 1/2012 |
| CN | 106160420 A | 11/2016 |

(Continued)

OTHER PUBLICATIONS

Light Stax, "Light Stax Junior Illuminated Building Blocks Classic Set—24 Piece Set" [retrieved from the Internet <URL:https://www.amazon.com/Light-Stax-Set-STAX-LS-M05000/dp/B00MVLF8BM?th=1>, retrieved on Nov. 7, 2022].

(Continued)

*Primary Examiner* — Thomas J. Hiltunen
(74) *Attorney, Agent, or Firm* — EAGLE IP LIMITED

(57) ABSTRACT

One example embodiment relates to a cascaded building block system, comprising: (a) at least one power block comprising: (i) an electrical power generator that provides electrical power; (ii) a microcomputer that generates messages; and (iii) at least one output coupling member that outputs the electrical power and the messages; (b) at least one functional block releasably coupled to the power block or to an adjacent functional block, each functional block comprises: (i) at least one input coupling member and at least one output coupling member; (ii) a microcomputer that receives and interpret the messages sent by the power block; (iii) a power distribution module controllable by the microcomputer to distribute the electric power to the at least one output coupling member; and (iv) a peripheral module; wherein the power block controls and distributes the electrical power to each of the functional blocks via the messages sent by the power block.

14 Claims, 10 Drawing Sheets

(56) References Cited

U.S. PATENT DOCUMENTS

| | | | |
|---|---|---|---|
| 8,753,164 B2* | 6/2014 | Hansen | A63H 33/042 446/85 |
| 9,914,066 B2* | 3/2018 | Cletheroe | A63H 33/042 |
| 10,047,940 B2* | 8/2018 | Grunzweig | F21V 21/096 |
| 10,340,697 B2* | 7/2019 | Paine | F01N 3/2066 |
| 10,673,165 B1* | 6/2020 | Wu | H01R 12/721 |
| 10,737,190 B2* | 8/2020 | Lee | A63H 33/042 |
| 2005/0116546 A1 | 6/2005 | Zeighami et al. | |
| 2008/0166926 A1 | 7/2008 | Seymour et al. | |
| 2009/0305602 A1 | 12/2009 | Gaute | |
| 2011/0021107 A1* | 1/2011 | Nag | A63H 33/042 446/91 |
| 2013/0217294 A1 | 8/2013 | Karunaratne | |
| 2023/0321557 A1* | 10/2023 | Cho | A63H 33/086 439/74 |

FOREIGN PATENT DOCUMENTS

| | | |
|---|---|---|
| JP | 2000237464 A | 9/2000 |
| JP | 2004209060 A | 7/2004 |
| WO | 2017118958 A1 | 7/2017 |
| WO | 2017155725 A1 | 9/2017 |
| WO | 2022045701 A1 | 3/2022 |

OTHER PUBLICATIONS

Lynx Technik AG, "Yellobrik", [retrieved from the internet <URL:https://www.lynx-technik.com/products/yellobrik/>, retrieved on Nov. 7, 2022].

* cited by examiner

CASCADED POWER AND SIGNAL PROCESSING BLOCK SYSTEMS AND METHODS THEREOF

FIELD OF INVENTION

This invention relates to a power block system, and in particular a power block system with a plurality of blocks that are cascaded together and a method of use thereof.

BACKGROUND OF INVENTION

In a typical household or commercial environment, it is common to find a variety of small electrical gadgets such as a simple digital clock, Bluetooth speakers, WiFi router or repeaters, desk lamps, small fans and/or digital photo album displays, etc. Almost all of them come with an individual power adapter which a user needs to plug to a power socket to supply power to these devices. These power adapters, together with their cabling, are typically laid on a corner of the floor, near a wall or on a desk, making the living quarter unduly messing and, in some cases, hazardous. On the other hand, each of these gadget devices draws little electric power. Hence, it is desirable do away with all these adapters and associated cabling, and yet be able to provide power to all these gadgets.

SUMMARY OF INVENTION

In the light of the foregoing background, in certain embodiments, it is an object to provide a flexible and easily re-configurable power distribution platform to supply electric power to a variety of devices.

Accordingly, an example embodiment of the present disclosure relates to a cascaded building block system, comprising: (a) at least one power block comprising: (i) an electrical power generator that provides electrical power; (ii) a microcomputer that generates messages; and (iii) at least one output coupling member that outputs the electrical power and the messages; (b) at least one functional block releasably coupled to the power block or to at least one adjacent functional block, each functional block comprises: (i) at least one input coupling member and at least one output coupling member, wherein the at least one input coupling member is connectable to the at least one output coupling member of the power block or to at least one output coupling member of an adjacent functional block to receive and transfer the electrical power and the messages; (ii) a microcomputer that receives and interpret the messages sent by the power block; (iii) a power distribution module controllable by the microcomputer to distribute the electric power to the at least one output coupling member; and (iv) a peripheral module receiving instructions from the microcomputer to perform specific function for the functional block; wherein the power block controls and distributes the electrical power to each of the functional blocks via the messages sent by the power block.

In another example embodiment, provided is a method of controlling a distribution of electric power in a cascaded building block system, wherein the cascaded building block system comprises at least one power block and at least one functional block that is releasably coupled to the power block or an adjacent functional block, wherein at least one input coupling member of the functional block can receive the electric power and messages reliably from at least one output coupling member of the power block or another functional block, comprising: providing, by the power block, the electric power; generating, by a microcomputer in the power block, the messages; receiving, by at least one input coupling member of a functional block, the electric power and the messages; interpreting, by a microcomputer in the functional block, the received message; and controlling an output power status of at least one output coupling member of the functional block based on the interpretation of the received message.

Other example embodiments are discussed herein.

There are various advantages in the various embodiments. For example, in some embodiments, the cascaded building block system includes coupling members to transfer messages and electrical power between the plurality of blocks. Messages are sent by the microcomputer of the power block that functions as a message sender and received by another microcomputer of each functional block that functions as a message receiver. Microcomputers in different types of functional blocks may operate differently based on codes or message pattern sent from the message sender. As a result, a single message can be sent from the message sender and those functional blocks configured to respond to the same message pattern can respond concurrently. In some embodiments, a user can remotely control the cascaded building block system by a remote controller (such as a mobile phone) by sending wireless signals to the power block to control the operation of the power block system.

In some embodiments, the power block and/or individual functional block control power passing to coupling members of each block of the system through a power distribution module, and identify which coupling member has incoming power, allowing a dynamic signal processing in local region, which enhances the power efficiency and throughput of the cascaded building block system. In some embodiments, the coupling members in each block can also be used to change the behavior of power output. Centralized control by messages from power block and regional signal control through coupling members can be both utilized to perform one or more predetermined function.

In some embodiments, individual functional blocks with different peripheral modules can be added to the cascaded building block system to provide additional functions to the system. For example, by adding a thermometer block below a light block, one can create a new combination of the cascaded building block system such as a temperature controlled light.

In some embodiments, the cascaded building block system may have more than one power block that are cascaded to supply higher power to the functional blocks. When the entire cascaded building block system requires a more electric power, a user can add one or more extra power blocks to ensure the cascaded building block system maintain its efficiency and meet the power consumption requirement.

DETAILED DESCRIPTION

Figure 1A:
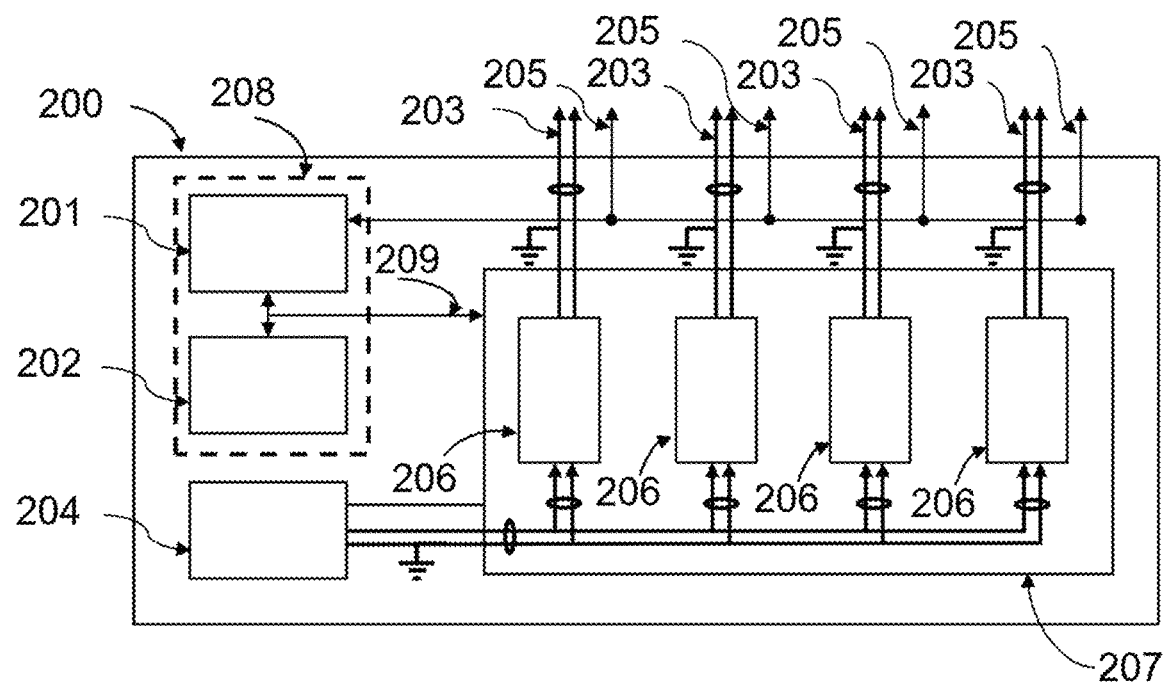
FIG. 1A is a schematic hardware block diagram for a power block according to an example embodiment.

As used herein and in the claims, "comprising" means including the following elements but not excluding others.

As used herein and in the claims, "couple" or "connect" refers to electrical and/or mechanical coupling or connection either directly or indirectly via one or more electrical and/or mechanical means unless otherwise stated.

As used herein and in the claims, the terms "general" or "generally", or "substantial" or "substantially" mean that the recited characteristic, angle, shape, state, structure, or value need not be achieved exactly, but that deviations or variations, including for example, tolerances, measurement error, measurement accuracy limitations and other factors known to those of skill in the art, may occur in amounts that do not preclude the effect the characteristic was intended to provide. For example, an object that has a "generally" rectangular shape would mean that the object has either an exact rectangular shape or a nearly exact rectangular shape. In another example, an object that is "substantially" perpendicular to a surface would mean that the object is either exactly perpendicular to the surface or nearly exactly perpendicular to the surface, e.g., has a 5% deviation.

As used herein and in the claims, "power block" refers to a block that supply power to other blocks that are directly or indirectly connected to it in a cascaded building block system. In some embodiments, the power block can be in electrical connection with an external power source via cable or other electronic means for external power supply. In some other embodiments, the power block may have an internal power source such as one or more batteries to power the power block as well as other blocks in a cascaded building block system.

As used herein and in the claims, "functional block" refers to a block that receive power directly or indirectly from the power block in a cascaded building block system. In some embodiments, the functional block may have coupling members to receive power and messages from at least one adjacent block (a power block or another functional block). In some embodiments, the functional block may have coupling members to pass power and messages to at least one adjacent block. In some embodiments, the functional block may have at least one peripheral module that performs a predetermined function in response to the signals.

As used herein and in the claims, "cascade" or "cascaded" refers to physical attachment as well as electrical connection of one block to another via coupling members. For example, when a second functional block is cascaded on top of a first functional block, it means that the second functional block is placed on top of the first functional block and physically attached as well as electrically connected with the first functional block via coupling members.

As used herein and in the claims, "input coupling member" of a block refers to coupling member that is configured to receive power and messages from an adjacent block.

As used herein and in the claims, "output coupling member" of a block refers to coupling member that is configured to pass power and messages to an adjacent block.

As used herein and in the claims, "message" refers to information that is carried by an electrical signal or waveform that is transmitted from a power block to one or more functional blocks in a cascaded building block system.

As used herein and in the claims, "message-pattern" refers to the information of the message in the form of a specific pattern that is transmitted from a power block to one or more functional blocks. Each message-pattern is unique and carries a unique operational code for the functional block to execute. The message-pattern can exist in any forms. In some embodiments, the message-pattern may be a sequence of binary digits which contains the operational code. In some embodiments, the message-pattern may be a duration of a square wave, wherein different duration carries different operational code for the functional block to execute.

As used herein and in the claims, "instruction" refers to signal that is transmitted within a block from a microcomputer to a peripheral module to instruct the peripheral module to perform a specific function.

It shall be understood by one of skill in the art that structures such as notches, buttons, protrusions, and studs can come in a variety of shapes and sizes.

It is to be understood that terms such as "top", "bottom", "middle", "side", "length", "inner", "outer", "interior", "exterior," and the like as may be used herein, merely describe points of reference and do not limit the present invention to any particular orientation or configuration. Further, terms such as "first," "second," "third," etc., merely identify one of a number of portions, components and/or points of reference as disclosed herein, and likewise do not limit the present invention to any particular configuration or orientation.

In some embodiments, provided is a cascaded building block system, comprising: (a) at least one power block comprising: (i) an electrical power generator that provides electrical power; (ii) a microcomputer that generates messages; and (iii) at least one output coupling member that outputs the electrical power and the messages; (b) at least one functional block releasably coupled to the power block or to at least one adjacent functional block, each functional block comprises: (i) at least one input coupling member and at least one output coupling member, wherein the at least one input coupling member is connectable to the at least one output coupling member of the power block or to at least one output coupling member of an adjacent functional block to receive and transfer the electrical power and the messages;

(ii) a microcomputer that receives and interpret the messages sent by the power block; (iii) a power distribution module controllable by the microcomputer to distribute the electric power to the at least one output coupling member; and (iv) a peripheral module receiving instructions from the microcomputer to perform specific function for the functional block; wherein the power block controls and distributes the electrical power to each of the functional blocks via the messages sent by the power block.

In some embodiments, the at least one power block further comprises a power distribution module controllable by the microcomputer to distribute the electric power to the at least one output coupling member.

In some embodiments, each input coupling member has a shape of a notch and each output coupling member has a shape of a stud that is complementary to the shape of the notch, wherein the input coupling member comprises a first set of conducting plates attached to the notch and the output coupling member comprises a second set of conducting plates attached to the stud, such that when a first block is physically connected to a second block, the stud of the first block is firmly inserted into the notch of the second block so that the first set of the conducting plates is reliably contacting the second set of conducting plates causing the electric power and the messages to flow from the first block to the second block, wherein the first block is the power block or the functional block and the second block is a different functional block.

In some embodiments, each message generated by the power block is drawn from a plurality of message-patterns; each message-pattern is unique and carries a unique operational code for the functional block to execute.

In some embodiments, each functional block is configured to interpret and process at least one message-pattern, and when a functional block receives a message, the functional block is configured to: (a) examine if the message-pattern in the received message is the same as the at least one message-pattern that the functional block is configured to respond; (b) perform an operation specified by the message-pattern if the message-pattern is the same as the at least one message-pattern that the functional block is configured to respond; and (c) ignore the message if the message-pattern is different from the at least one message-pattern that the functional block is configured to respond.

In some embodiments, the message-pattern comprises a sequence of binary digits, wherein the sequence of binary digits is partitioned into an action-ID field, an Op-code and a function-ID field.

In some embodiments, the sequence of binary digits is sixteen bits long; the action-ID field is eight bits long, the Op-code is four bits long and the function-ID field is four bits long.

In some embodiments, the message-pattern is a duration of a square wave, and wherein different duration carries different operational code for the functional block to execute.

In some embodiments, the power distribution module of the functional block further comprises a plurality of power regulator modules, each of the power regulator module connected to the input coupling member for receiving the electric power and the messages at one end and to the output coupling member at the other end, wherein upon receiving instruction from the microcomputer of the functional block, the power distribution module causes a specific power regulator module to change an electric power output status of a specific output coupling member between a disconnect state and a connect state.

In some embodiments, the message generated by the power block includes instruction for the microcomputer of the functional block to instruct the specific power regulator module to change the electric power output status.

In some embodiments, when a sensor in the peripheral module of the functional block microcomputer detects an abnormal reading, the microcomputer issues instruction to instruct the specific power regulator module to change the electric power output status.

In some embodiments, provided is a method of controlling a distribution of electric power in a cascaded building block system, wherein the cascaded building block system comprises at least one power block and at least one functional block that is releasably coupled to the power block or an adjacent functional block, wherein at least one input coupling member of the functional block can receive the electric power and messages reliably from at least one output coupling member of the power block or another functional block, comprising: providing, by the power block, the electric power; generating, by a microcomputer in the power block, the messages; receiving, by at least one input coupling member of a functional block, the electric power and the messages; interpreting, by a microcomputer in the functional block, the received message; and controlling an output power status of at least one output coupling member of the functional block based on the interpretation of the received message.

In some embodiments, the method further comprises: distributing, by a power distribution module controllable by the microcomputer in the power block, the electric power and the messages to at least one output coupling member of the power block.

In some embodiments, each message is drawn from a plurality of message-patterns; each message-pattern is unique and carries a unique operational code for the functional block to execute and each functional block is configured to interpret and process at least one message-pattern, further comprising: examining, by the functional block, if the message-pattern in the received message is the same as the at least one message-pattern that the functional block is configured to respond; and performing, by the functional block, an operation specified by the message-pattern if the message-pattern is the same as the at least one message-pattern that the functional block is configured to respond.

In some embodiments, the method further comprises: adding one or more power block to the cascaded building block system to increase a power output capacity of the cascaded building block system when needed.

In the following description, same numberings are employed to illustrate the same components of different figures.

Cascaded Power and Signal Processing Block Systems

Example 1

As discussed earlier, many users employ a number of electrical appliants and gadgets for the convenience of their daily living. As each of these gadgets requires electric power to operate, it is therefore desirable to develop a flexible and easily re-configurable power distribution platform to supply electric power to them. The following embodiments and examples discuss various aspects of such a platform.

In one embodiment, the platform (also referred to as a cascaded building block system in some embodiments) comprises a power provider unit to provide electric power to all the electrical appliants. In a further embodiment, this power unit as well as the electrical appliants are mounted or housed with a special housing configuration. Such housing configuration offers a standardized electrical male and female connectors with a predetermined form factor so that a user can easily insert the male connector of one unit to the female connector of another unit. In the followings, the special housing configuration is referred as block or brick. Hence the power provider is called a power block and those that house the electrical appliants are called functional blocks. Examples of functional blocks may be a temperature block for the thermometer appliant, a light block for a LED lamp, or a fan block for a small electric fan.

In a further embodiment, the power block provides a plurality of male connectors while each functional block have at least one female connector and at least one male connector. Internal wirings within each block are configured such that when a male connector of a first block is inserted to a female connector of a second block, electric power is flowed from the first block to the second block. Thus when multiple functional blocks are cascaded together, all the functional blocks receive electric power.

In yet another embodiment, the male and female connectors further provide an additional electric wire to transmit electric signal. This signal carries a message that the power block sends to all the functional blocks. Each functional block is configured to process at least one specific message. When a functional block receives a message, it checks if the message is meant for this functional block. If so, it performs the intended operation. Otherwise, it ignores the message. An example of such a message would be "TURN OFF LIGHT". In this case, those light blocks will turn their lights off but a fan block will just ignore it. In this way, the power block can send message to control individual functional block. Effectively, it acts as a centralized command center.

The power block and the functional block can assume different sizes and shapes. These blocks may be made as modular decorative bricks so that a user can easily and flexibly assemble them together in any combination the user wants. Example applications of the cascaded power bricks are, but are not limited to:

1. Decorative walls or cabinets in a living room or a bedroom;
2. A desk with four legs and desk lamps at the corners;
3. Audio/Visual entertainment system using modular electrical appliance.

Power Block and Functional Block

Figure 1B:
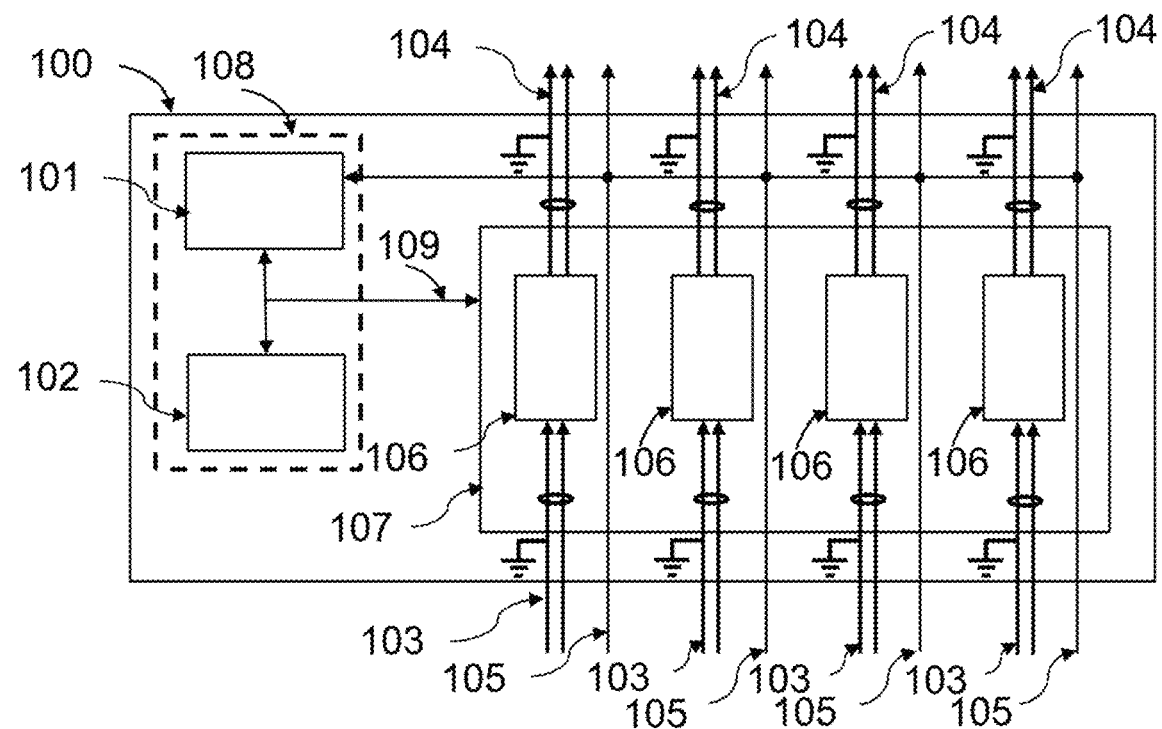
FIG. 1B is a schematic hardware block diagram for a functional block according to an example embodiment.

FIGS. 1A and 1B shows a hardware block diagram for the power block and the functional block respectively. Referring to FIG. 1A, the power block 200 consists of an electrical power generator 204, which supplies power to a power distribution module 207; as well as a microcomputer 208 that includes a microprocessor 201 and a peripheral module 202. Within the power distribution module 207, there are a plurality of power regulator modules 206. These power regulator modules 206 connect to and receive electrical power from the electrical power generator module 204 and transfer it to respective output power lines 203. In one embodiment, the output power lines 203 has a pair of electric wires, one connected to the electric ground and the other one carries a positive voltage to supply power. In other embodiments, the microcomputer 208 sends instruction signal 209 to the power distribution module 207, which will in turn distribute this instruction to each of these power regulator modules 206 to regulate the power output rating so that the output electric power at output power lines 203 may be 0% (i.e. disconnected), or 100% (i.e. fully connected). In some other embodiments, the power distribution module 204 may be configured to transfer the electrical power to all output power lines 203. The microprocessor 201 also sends and receives signals from the peripheral module 202. In one embodiment, the peripheral module may consist of a button, a receiver that receives signals from a wireless remote controller, or an interface to the Internet or the Local Area Network (LAN). Furthermore, in some embodiments, the microcomputer 208 can also generate messages that will be sent to functional blocks connected to this power block via message wires 205.

The functional block 100 as shown in FIG. 1B has similar hardware arrangement as that of the power block 200. It also comprises a microcomputer 108 that includes a microprocessor 101 and a peripheral module 102, a power distribution module 107 which further comprises a plurality of power regulator modules 106. The power regulator modules 106 receive electrical power from the input power lines 103 and transfer it to respective output power lines 104. In one embodiment, both the input power lines 103 and the output power lines 104 consist of a pair of electric wires, one connected to the electric ground and the other one carries a positive voltage to supply power. In other embodiments, the microcomputer 108 sends instruction signal 109 to the power distribution module 107, which will in turn distribute this instruction to each of these power regulator modules 106 to regulate the power output rating so that the output electric power at output power lines 104 may be 0% (i.e. disconnected), or 100% (i.e. fully connected). The microprocessor 101 also sends and receives signals from the peripheral module 102. In one embodiment, the peripheral module 102 may consist of various sensing devices such as temperature sensor, barometer sensor, humility sensor and the likes. It may also consist of actuators such as a fan, a motor and one or more illuminating devices. In other embodiments, the peripheral module 102 may be a display monitor; or a communication module such as Bluetooth or WiFi devices. Furthermore, the microcomputer 108 also receives messages sent from the power block 200 via message wires 105; and it will also forward the same messages to other functional blocks connected to this functional block.

It should be noted that both the microcomputer 208 of the power block 200 and the microcomputer 108 of the functional block 100 receive electric power either from the power generator 204 or from the input power lines 103.

Figure 2:
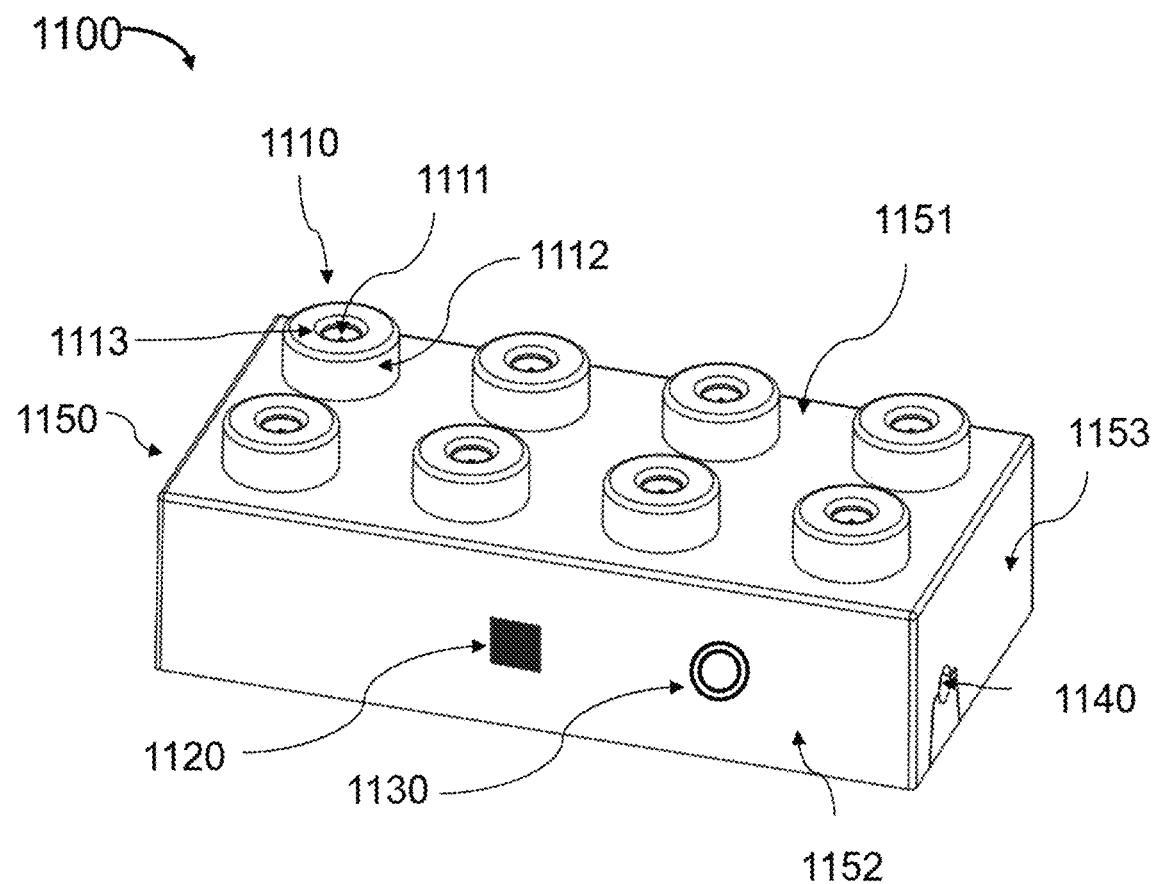
FIG. 2 is a perspective view of a power block according to an example embodiment.
Figure 3A:
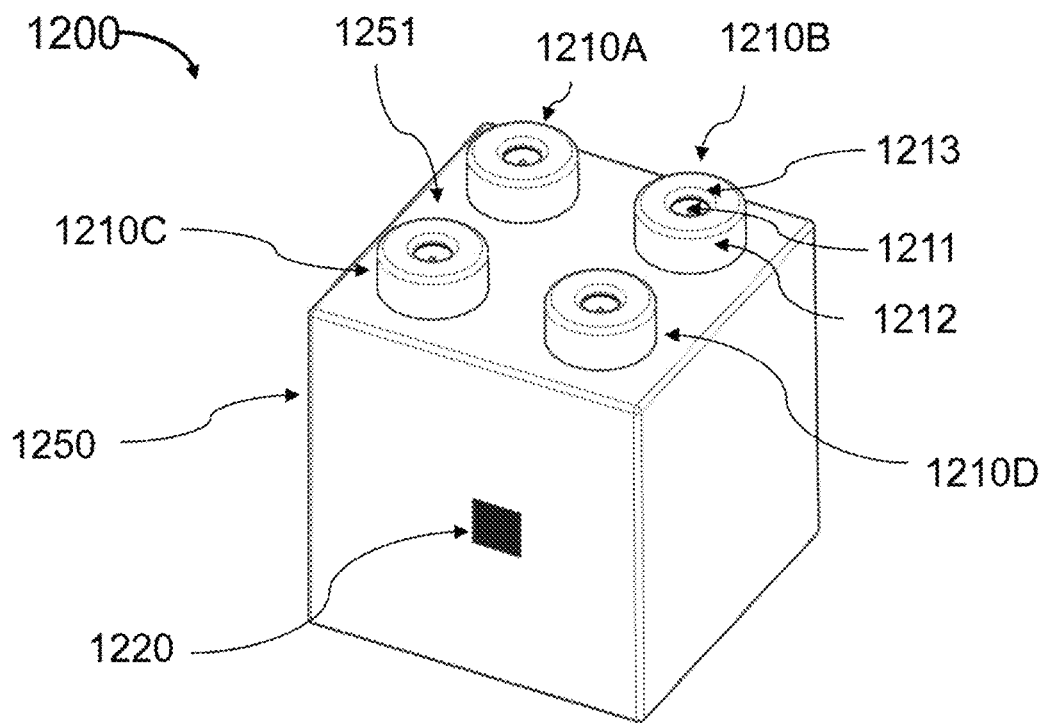
FIGS. 3A and 3B show a perspective view and a transparent perspective view of a functional block according to an example embodiment.
Figure 3B:
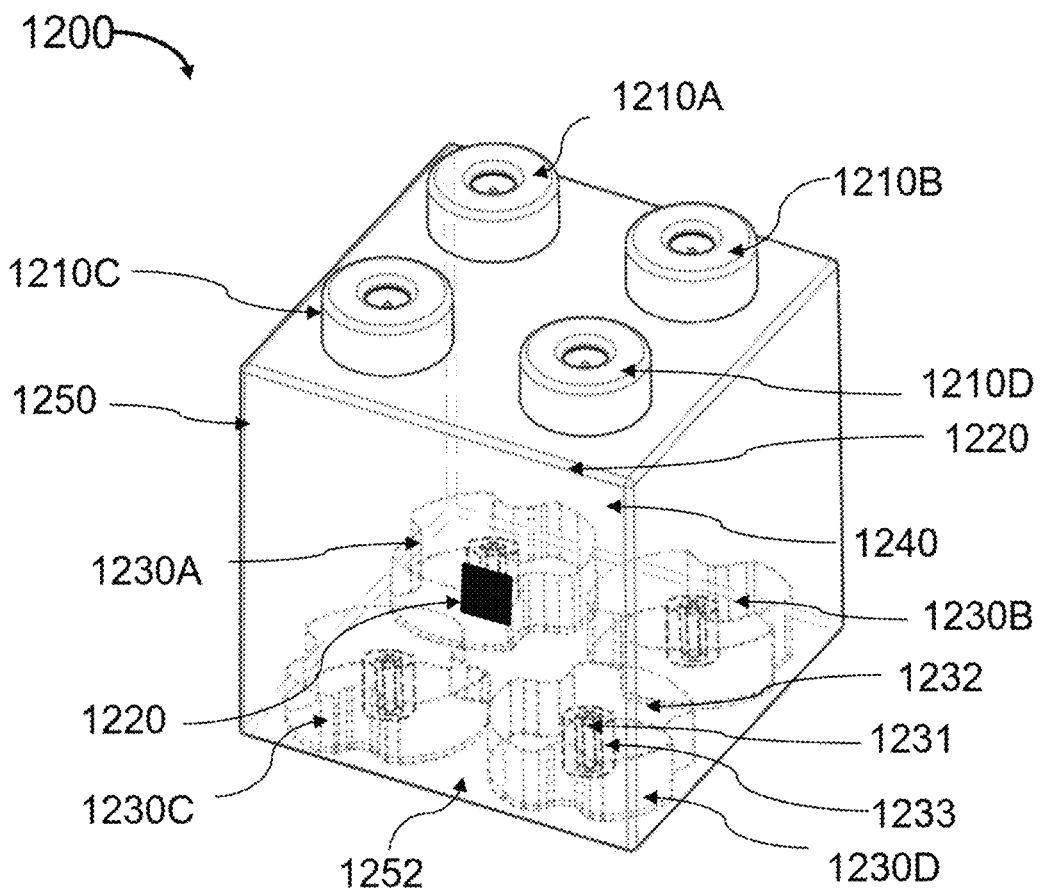

Physically, the power block and the functional block may assume various dimensions and shapes. FIG. 2 shows one exemplary embodiment of a power block while FIGS. 3A and 3B show exemplary embodiments of a functional block.

Power Block

Referring to FIG. 2, the power block 1100 has a power block housing 1150 with a generally rectangular shape in this embodiment. The power block housing 1150 has a top side 1151, a bottom side (not shown), a front side 1152, a back side (not shown), a left side 1153 and an opposing right side (not shown). In this embodiment, the power block microcomputer 1120 is housed within the power block housing 1150. Detail electrical connections with various modules inside the power block is omitted for clarity reason. In one embodiment, the power block 1100 has eight power block output coupling members 1110 disposed on the top side 1151 for coupling with one or more functional blocks. Each of the power block output coupling members 1110 includes an output coupling pin 1111 protruding outwardly from the top side 1151 and a stud 1112 encompassing the output coupling pin 1111. In some embodiments, the output coupling pin 1111 is made of conductive material and is connected to the message wire 205 as shown in FIG. 1B. In this embodiment, the stud 1112 is shaped as a hollow cylinder with a hole 1113 positioned at a top end of the stud 1112. Furthermore, in some embodiments, there are two separate, non-touching semi-circular conducting plates (not shown) firmly adhered to the inner circle of the stud 1112. These two conducting plates are electrically connected to the two output power lines 203. The hole 1113 of the stud 1112 is provided to expose a part of the output coupling pin 1111 and the two conducting plates for coupling. As such, electric power and message can be transferred by way of the conducting plates and this output coupling pin 1111 to an adjacent block (for example, a functional block) coupled with the power block 1100. The stud 1112 is adapted for securing the mechanical connection between the power block output coupling member 1110 and an input coupling member of the adjacent functional block (not shown). In some embodiments, a coupling positioning mechanism (not shown) may be provided to ensure that the power block output coupling member 1110 connects with the input coupling member of the adjacent functional block at a correct orientation. In some embodiments, the coupling positioning mechanism may comprise of a protrusion extending inwardly from the inner circle of the stud 1112 and a groove disposed at a corresponding position of the input coupling member to receive the protrusion when the stud 1112 is inserted at a correct position.

In this example embodiment, the power block 1100 further includes a control component 1130 that is disposed at the front surface 1152. The control component 1130 can be a button protruding outwardly from the front surface 1152. In some embodiments, the power block microcomputer 1120, the control component 1130 and the power block coupling members 1110 are electrically connected with each other. The function of the control component 1130 will be described later.

In some embodiments, the power block 1100 is in electrical connection with an external power source (not shown) configured to supply power to operate the cascaded building block system. In this embodiment, the power block 1100 further includes a cable hole 1140 disposed on the first side surface 1140 to allow for a power cable (not shown) connected with the external power source to pass through. In some other embodiments, the power block 1100 may not have electrical connection with an external power source, but instead include an internal power source such as one or more batteries to power the power block 1100 as well as any functional blocks that are coupled with the power block 1100.

In some embodiments, the power block 1100 may further include, for example, a local area network (LAN) data transmission controller, a wide area network (WAN) data transmission controller, a network controller, an internal bus, and one or more input devices etc. In some embodiments, the power block 1100 may include an internet cable that is connected with the power block microcomputer 1120. The internet cable transfers LAN/WAN signals from an internet service provider, allowing the power block 1100 to be connected to the internet. Hence the power block 1100 may be a part of an internet of things.

Functional Block

Now referring to FIGS. 3A and 3B, which shows the functional block 1200. In this embodiment, the functional block 1200 has a functional block housing 1250 with a generally square shape. The functional block housing 1250 includes a top side 1251 and an opposing bottom side 1252. The functional block 1200 further includes four output coupling members 1210A, 1210B, 1210C and 1210D disposed on the top side 1251, and four input coupling members 1230A, 1230B, 1230C and 1230D disposed on the bottom side 1252. As shown in FIG. 3B, the functional block microcomputer 1220 is housed within the functional block housing 1250. In some embodiments, the functional block 1200 may further include one or more peripheral module (not shown) that are either housed within or disposed on the functional block housing 1250.

In this embodiment, the output coupling members 1210A, 1210B, 1210C and 1210D have a generally similar structure to the power block output coupling members 1110 (shown in FIG. 2) as described above. The output coupling members are configured to reversibly couple with input coupling members of one or more adjacent blocks (for example, functional blocks) to transfer power and messages. Each of the output coupling members 1210A, 1210B, 1210C and 1210D includes an output coupling pin 1211 protruding outwardly from the top side 1251 and a stud 1212 encompassing the output coupling pin 1211. In some embodiments, the output coupling pin 1211 is made of conductive material and is connected to the message wire 105 as shown in FIG. 1B. In this embodiment, the stud 1212 is shaped as a hollow cylinder with a hole 1213 positioned at a top end of the stud 1212. Furthermore, in some embodiments, there are two separate, non-touching semi-circular conducting plates (not shown) firmly adhered to the inner circle of the stud 1212. The hole 1113 of the stud 1112 is provided to expose a part of the output coupling pin 1111 and the two conducting plates for coupling. These two conducting plates are electrically connected to the output power lines 104. As such, electric power and message can be transferred by way of the semi-circular conducting plates and this pin to an adjacent functional block. The stud 1212 is adapted for securing the mechanical connection between the output coupling member (for example, output coupling member 1210A) and an input coupling member of an adjacent block.

The input coupling members 1230A, 1230B, 1230C and 1230D are configured to reversibly couple with the output coupling members of one or more adjacent functional blocks or the power block output coupling members of the power block 1100 (as shown in FIG. 2) to receive power and messages therefrom. In this embodiment, each of the input block coupling members includes a notch 1232 that is cut on the bottom side 1252, an input coupling receptacle 1231 positioned within the notch 1232, and a cylindrical shell 1233 encompassing the input coupling receptacle 1231. In some embodiments, the notch 1232 is sized and shaped to securely receive the stud 1212 of the output coupling member of an adjacent functional block (not shown) or the stud 1112 the power block output coupling member of the power block 1100 (as shown in FIG. 2), and the cylindrical shell 1233 is sized and shaped to match with the inner circle of the stud 1112, such that the connection between the functional block 1200 and the adjacent functional block or the power block is secured when the notch 1232 of the input coupling member is connected with the stud of the output coupling member or the power block output coupling member. In some embodiments, the input coupling receptacle 1231 is made of conductive material and is connected to the message wire 105 as shown in FIG. 1B. Furthermore, there are two separate, non-touching semi-circular conducting plates (not shown) firmly adhered to the sidewall of the cylindrical shell 1233. These two conducting plates are electrically connected to the input power lines 103. As such, when the notch 1232 of a functional block is firmly inserted to the stud of an adjacent functional block or a power block, the semi-circular conducting plates at the outer circle of the notch is electrically connected to the semi-circular conducting plates at the inner circle of the stud; and the input coupling receptacle 1231 is electrically connected to the output coupling pin of the adjacent functional block or the power block. Thus, electric power and messages can flow from either the power block or a functional block to another functional block reliably.

In some embodiments, a coupling positioning mechanism (not shown) may be provided to ensure that each of the output coupling member connects with the input coupling member of the adjacent functional block at a correct orientation. This is to prevent any potential short-circuit situation whereby the ground wire of one block is accidentally connected to the power wire carrying a positive voltage. In some embodiments, the coupling positioning mechanism may comprise of a protrusion extending inwardly from the sidewall of the notch 1232 and a groove disposed at a corresponding position of the stud 1212 to receive the protrusion so that the stud 1212 can only engage with the notch 1232 at a correct position. In some other embodiments, the coupling positioning mechanism may comprise of a protrusion extending inwardly from the inner circle of the stud 1212 and a groove disposed at a corresponding position of the shell 1233 to receive the protrusion when the stud 1212 is inserted at a correct position. In some embodiments, the shape of the stud (and the corresponding shape of the notch) is asymmetrical and complementary of each other to make sure that the stud can only be firmly inserted to the notch in one and only one orientation.

Although not shown in FIGS. 3A and 3B, it is understood that the functional block microcomputer 1220 are electrically connected to various modules as shown in FIG. 1A and such wiring connections are omitted for clarity purpose.

Figure 4A:
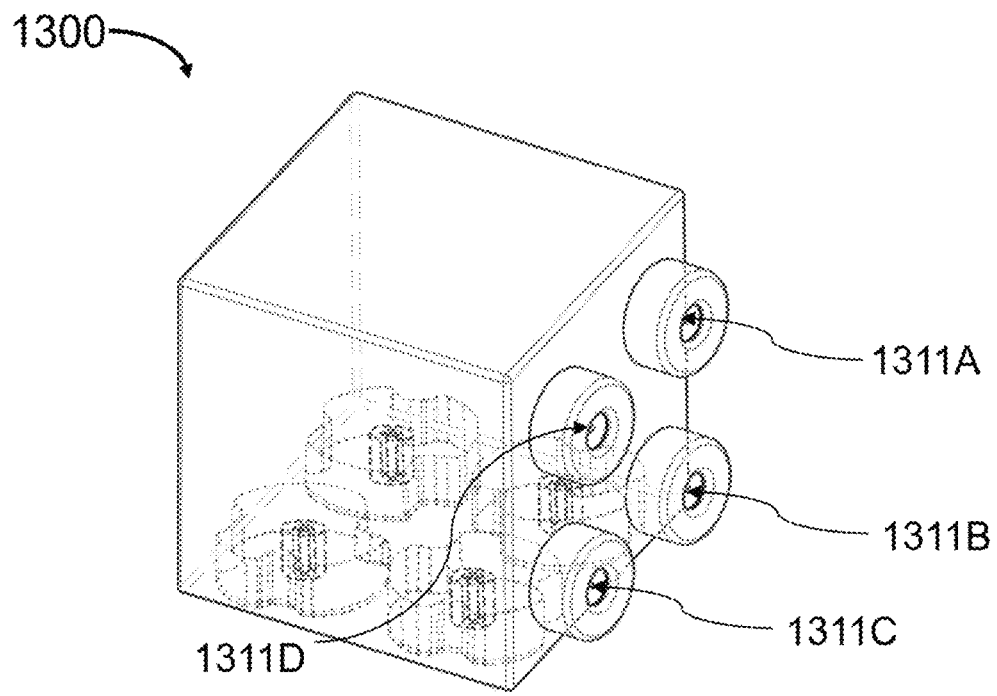
FIG. 4A shows a transparent perspective view of a functional block in which the output coupling members are disposed on a side surface according to another example embodiment.
Figure 4B:
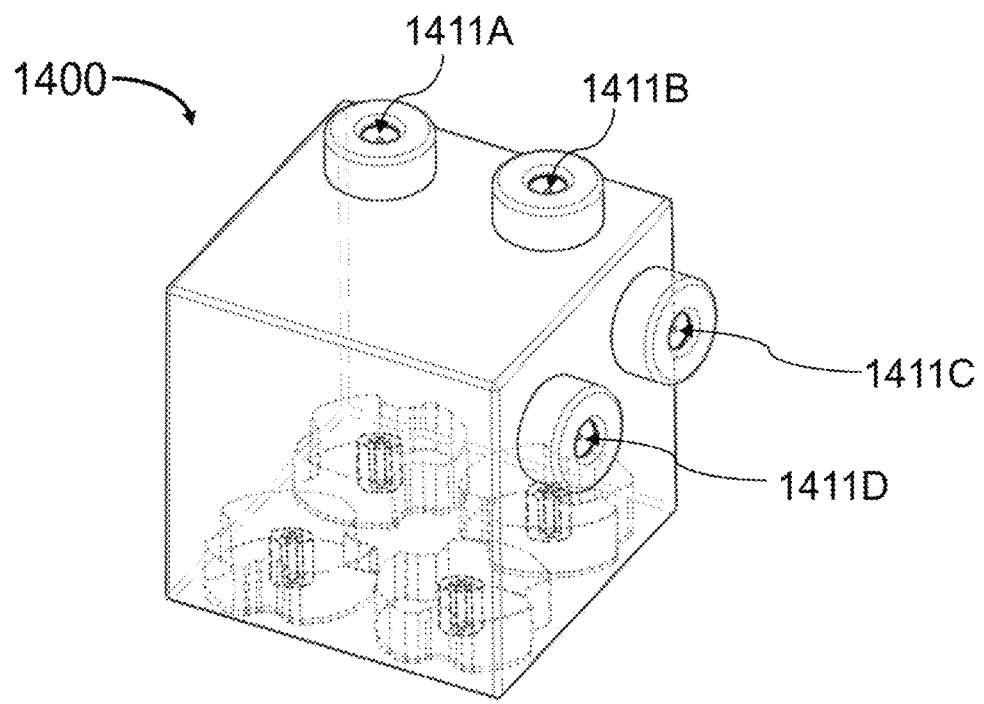
FIG. 4B shows a transparent perspective view of a functional block in which two output coupling members are disposed on a top surface and two output coupling members are disposed on a side surface according to another example embodiment.

While the power block 1100 and functional block 1200 depicted in FIG. 2 and FIGS. 3A and 3B are in general rectangular or square shapes. It should be understood that they can assume other shapes and dimensions; and the number of output coupling pins and input coupling pins in each block need not be restricted to four as shown in the figures. Moreover, the output coupling pins need not be fixed to be at the top surface of the block. As an example, FIG. 4A shows a functional block 1300 showing that the output coupling members 1311A, 1311B, 1311C and 1311D are disposed on one side surface of the functional block 1300; and FIG. 4B shows another embodiment whereby the functional block 1400 is configured such as two output coupling members 1411A and 1411B are disposed on the top surface while another two members 1411C and 1411D are disposed on one of the side surfaces. Those skilled in the art will appreciate that, based on the teaching of this disclosure, there can be many other variations on the placements of the output coupling members. These variations offer much flexibility to the user, as functional blocks need not stack up vertically but can also be expanded horizontally or diagonally, allowing a user to express his or her creativity in configurating the cascaded building block system.

Power and Message Wirings

Now referring back to FIGS. 1A and 1B. In one embodiment, the power block 200 supplies DC (direct current) voltage. In a further embodiment, the DC voltage is either 12V or 5V, with different current ratings. The power block 200 normally comes with over-current protection and short-circuit protection circuitry. As mentioned before, both the input power lines and output power lines consist of a pair of electric wires, one is the ground wire and the other carries a positive voltage. Together with the message wire, each input coupling member and output coupling member requires three connectors to transmit the electric power and message to subsequent blocks connected to this cascaded building block system.

In a further embodiment, power line communication technology may be employed so that the message signal is embedded to the power line that carries positive voltage (hereafter refer to as the positive power line) through certain modulation scheme so that there is no need for a separate message wire to transmit messages. This will substantially simplify the mechanical and electrical design and manufacturing of the studs and notches discussed above. In essence, the digital waveform of the message is first modulated and then coupled to the positive power line by a modulation module. Then at each functional block, a demodulation module coupled to the positive power line is used to extract the message out from the power lines. Therefore if power line communication technology is used, message wires 205 of the power block 200 and message wires 105 of the functional block 100 are no longer needed. However, for the power block 200, a modulation module coupling the message waveform from the microcomputer 208 to the output power lines 203 is needed. In addition, for every functional block 100, a corresponding demodulation module coupling the input power lines 103 to the microcomputer 108 is also required, so that the microcomputer can retrieve the message sent by the power block.

In operation, a cascaded building block system comprises at least one power block 200 and one or more functional blocks 100 which are electrically connected to this power block 200 so that the input power lines 103 of a functional block 100 are connected to either the output power lines 203 of the power block 200 or the output power lines 104 of the adjacent functional block it is coupled to. Similarly, the message wires 105 of a functional block 100 are electrically connected to the message wires 203 of the power block 200 or that of the adjacent functional block it is coupled to.

In one embodiment, the electrical power generator 204 of power block 200 is connected to a power source, which may be an external power source (not shown) or an internal battery pack. The electrical power generator 204 will convert the electric power of a power source to a voltage and current rating that is suitable for the whole cascaded building block system. Through the output power lines 203 of the power block 200 and interconnections between the output power lines 104 and the input power lines 103 of the functional blocks 100, electric power is distributed to the entire cascaded building block system. The microcomputer 201 of the power block 200 can also generate power regulating messages that is transmitted via the message wires to all the functional blocks interconnected to the power block so that all functional blocks in the system can receive the same message. In one embodiment, each message carries a specific command in a special format which will be discussed in detail below. The microcomputer 101 of each functional block 100 is configured to receive, interpret and process at least one specific message. On the other hand, more than one functional block in a cascaded building block system may be configured to receive and process the same specific message.

In some embodiments, the peripheral module 101 of each functional block 100 is configured to perform a specific function in response to the specific message received by the microprocessor 101. The microprocessor 101 may also sends and receives signals from the peripheral module 102. For ease of description, the functional block will be named after the specific peripheral module or one of the peripheral modules it comprises. For example, in some embodiments, a functional block comprising a lighting module (such as LED light, a light bulb, a light strip or the like) will be referred to as a "light block"; a functional block comprising a thermometer and a display will be referred to as a "thermometer block"; a functional block comprising a fan will be referred to as a "fan block"; and so on.

As an example, consider a lighted wall having plenty of light blocks and one or two speaker blocks. In a conventional situation whereby each light block or speaker block has its own power switch, a user would need to physically go near each light block and turn the light on and off one by one. That is tedious and time consuming. On the other hand, if all the light blocks and speaker blocks are functional blocks as described in this invention; and they are all coupled and connected together to a power block to form a cascaded building block system, then the power block can issue just one single message such as "TURN-LIGHT-OFF". This message will be transmitted to all the functional blocks. All the light blocks will respond to this message to turn light off; but the speaker block will ignore this message and will remain unaffected. This is one major advantage of this cascaded building block system.

In a separate embodiment, the power distribution module 107 of the functional block may cut off or ration the power outflow of this block. The microcomputer 101 of the functional block can send specific instruction to the power distribution module 107 to cut off one or more output power lines, so that all those functional blocks connected downstream may not receive any power. In one embodiment, the microcomputer 101 receives a sensor signal from its peripheral module 102 and after analyzing this signal, it sends out the aforementioned instruction. As an example, the output power lines of a temperature block is connected to the input power lines of a fan block. When the temperature sensor detects that the room temperature is lower than a predetermined threshold, it alerts the microcomputer to send power cut-off instruction to the power distribution module 107 of the temperature block. This in turn will cause the power regulator module 106 to break the connection between the input power lines 103 and output power lines 104 within the temperature block. As such, no power is sent to the fan block and hence the fan is turned off.

In another embodiment, the power block may send specific power rationing message to all the functional blocks, commanding the functional blocks to cut off or reconnect a particular pair of output power lines. In this case, the message is first received by the microcomputer 101 of the functional block 100. If the functional block is configured to process this type of message, then the microcomputer 101 will send instruction to the power distribution module 107, which in turns will cause a particular power regulator module 106 to cut off or reconnect the power output.

Message

In an embodiment, the message that the power block 200 generated is in the form of a specific message-pattern (also referred to as a Full Message ID) with the following format: it consists of an Activity-ID, an Op-code and a Function-ID. The Activity-ID defines a broad category of activities. The Op-Code further specifies the particular operation within this category and the Function-ID provides the operational parameters. Together the message uniquely defines a specific operation. In one embodiment, the message consists of sixteen (16) binary digits. The Activity-ID consists of 8 binary digits while the Op-Code and the Function-ID have 4 binary digits each. Thus, there can be a total of $2^{16}=65536$ unique messages.

Table 1 below shows an exemplary embodiment of one such group of messages whereby the Activity-ID=00000001. This group of activities focuses on instructing the peripheral modules of the functional blocks to perform certain functions.

TABLE 1

Look up table for messages with Activity-ID = 00000001

| Functional description of messages | Full Message ID | Activity-ID | Op-Code | Function ID | Example Functions |
|---|---|---|---|---|---|
| ON/OFF Master | 0000000100010000 | 00000001 | 0001 | 0000 | Toggle output of all the actuator's function, without opening the circuit, so power can still pass through |
| ON/OFF bluetooth | 0000000100100000 | 00000001 | 0010 | 0000 | Toggle output of the actuator's bluetooth feature to receive bluetooth signal, other features are unaffected |
| Volume Control | 0000000100110000 | 00000001 | 0011 | 0000 | Toggle Volume Control |
| Volume Control Function 1 (Increase Volume) | 0000000100110001 | 00000001 | 0011 | 0001 | Increase current to sound output. |
| Volume Control Function 2 (Decrease Volume) | 0000000100110010 | 00000001 | 0011 | 0010 | Decrease current to sound output. |
| ON/OFF motor | 0000000101000000 | 00000001 | 0100 | 0000 | Toggle Motor Control |
| Motor Control Function 1 (Increase Speed) | 0000000101000001 | 00000001 | 0100 | 0001 | Increase current to Motor output. |

TABLE 1-continued

Look up table for messages with Activity-ID = 00000001

| Functional description of messages | Full Message ID | Activity-ID | Op-Code | Function ID | Example Functions |
|---|---|---|---|---|---|
| Motor Control Function 2 (Decrease Speed) | 0000000101000010 | 00000001 | 0100 | 0010 | Decrease current to Motor output |
| ON/OFF thermometer control | 0000000101010000 | 00000001 | 0101 | 0000 | Toggle Thermometer Control, to allow power going thru based on temperature condition |
| Control Thermometer output coupling member when above Preset | 0000000101010001 | 00000001 | 0101 | 0001 | Allow power pass through when above the preset temperature |
| Control Thermometer output coupling member when below Preset | 0000000101010010 | 00000001 | 0101 | 0010 | Allow power pass through when below the preset temperature |
| ON/OFF thermometer Display of current temperature | 0000000101010011 | 00000001 | 0101 | 0011 | Toggle Thermometer Control, that will toggle of LCD display on current temperature |
| ON/OFF barometer display | 0000000101100000 | 00000001 | 0110 | 0000 | Toggle Barometer, that will lead to display of LCD Display of humidity |
| Control Barometer output coupling member when above Preset humidity | 0000000101100001 | 00000001 | 0110 | 0001 | Allow power pass through when above the preset humidity |
| Control Barometer output coupling member when below Preset humidity | 0000000101100010 | 00000001 | 0110 | 0010 | Allow power pass through when below the preset humidity |
| Toggle barometer display Back Light | 0000000101100011 | 00000001 | 0110 | 0011 | Toggle Barometer, that will lead to back light of LCD Display to be permanently turned ON/OFF |
| ON/OFF LED 1 | 0000000101110000 | 00000001 | 0111 | 0000 | Turn ON all LEDs that is linked to Pin 6 |
| ON/OFF LED 2 | 0000000110000000 | 00000001 | 1000 | 0000 | Turn ON all LEDs that is linked to Pin 7 |
| ON/OFF LED 3 | 0000000110010000 | 00000001 | 1001 | 0000 | Turn ON all LEDs that is linked to Pin 8 |
| Home Refresh Spray ON/OFF | 0000000110100000 | 00000001 | 1010 | 0000 | ON/OFF Spray Control |
| Refresh Spray every hour | 0000000110100001 | 00000001 | 1010 | 0001 | Eject refresh spray every hour |
| Refresh Spray every 6 hours | 0000000110100010 | 00000001 | 1010 | 0010 | Eject refresh spray every 6 hours |
| Refresh Spray self preset | 0000000110100011 | 00000001 | 1010 | 0011 | Eject refresh spray at self preset frequency |
| Home Humidifier ON/OFF | 0000000110110000 | 00000001 | 1011 | 0000 | ON/OFF Humidifier Control |
| Fan ON/OFF | 0000000111000000 | 00000001 | 1100 | 0000 | ON/OFF Fan/Motor Control |
| Fan Speed 1 | 0000000111000001 | 00000001 | 1100 | 0001 | Fan/Motor Control Speed 1 |
| Fan Speed 2 | 0000000111000010 | 00000001 | 1100 | 0010 | Fan/Motor Control Speed 2 |
| Fan Speed 3 | 0000000111000011 | 00000001 | 1100 | 0011 | Fan/Motor Control Speed 3 |
| Minutes Timer Block | 0000000111010000 | 00000001 | 1101 | 0000 | Toggle Timer ON, always allow power to go through output coupling members, or always allow power to be blocked through output coupling members |

TABLE 1-continued

Look up table for messages with Activity-ID = 00000001

| Functional description of messages | Full Message ID | Activity-ID | Op-Code | Function ID | Example Functions |
|---|---|---|---|---|---|
| Press/Pin Timer to identify minutes | 0000000111010001 | 00000001 | 1101 | 0001 | Allow Timer to take place, control minutes output of output coupling members |
| Hour Timer Block | 0000000111100000 | 00000001 | 1110 | 0000 | Toggle Timer ON, always allow power to go through output coupling members, or always allow power to be blocked through output coupling members |
| Press/Pin Timer to identify hours | 0000000111100001 | 00000001 | 1110 | 0001 | Allow Timer to take place, control hours output of output coupling members |
| Day Timer Block | 0000000111110000 | 00000001 | 1111 | 0000 | Toggle Timer ON, always allow power to go through output coupling members, or always allow power to be blocked through output coupling members |
| Press/Pin Timer to identify days | 0000000111110001 | 00000001 | 1111 | 0001 | Allow Timer to take place, control days output of output coupling members |

Table 2 below shows another exemplary embodiment of messages whereby the Activity-ID=00000010. In this embodiment, each functional block comprises four output coupling members 1A to 1D and four input coupling members 2A to 2D. This group of activities focuses on instructing the functional blocks to supply or cut off electric power output to a selected output coupling member; and to sense/capture whether there is input power from one or more selected input coupling members, all within a functional block. In some embodiments, the captured information (i.e. whether there is input power from one or more selected input coupling members) is stored within memory of the functional block.

TABLE 2

Look up table for messages with Activity-ID = 00000010

| Functional description of messages | Full Message ID | Activity-ID | Op-Code | Function ID | Example microprocessor action | Example Functions |
|---|---|---|---|---|---|---|
| Toggle 1A Output | 0000001010000001 | 00000010 | 1000 | 0001 | Toggle 1A Output | Allow a transfer of power thru 1A |
| Toggle 1B Output | 0000001010000010 | 00000010 | 1000 | 0010 | Toggle 1B Output | Allow a transfer of power thru 1B |
| Toggle 1C Output | 0000001010000011 | 00000010 | 1000 | 0011 | Toggle 1C Output | Allow a transfer of power thru 1C |
| Toggle 1D Output | 0000001010000100 | 00000010 | 1000 | 0100 | Toggle 1D Output | Allow a transfer of power thru 1D |
| Capture Input 2A | 0000001000010001 | 00000010 | 0001 | 0001 | Capture Input 2A | Capture whether there is power from 2A, and store within memory of the block |
| Capture Input 2B | 0000001000010010 | 00000010 | 0001 | 0010 | Capture Input 2B | Capture whether there is power from 2B, and store within memory of the block |
| Capture Input 2C | 0000001000010011 | 00000010 | 0001 | 0011 | Capture Input 2C | Capture whether there is power from 2C, and store within memory of the block |
| Capture Input 2D | 0000001000010100 | 00000010 | 0001 | 0100 | Capture Input 2D | Capture whether there is power from 2D, and store within memory of the block |
| Capture All Input | 0000001000100000 | 00000010 | 0010 | 0000 | Capture All Input | Capture the input status of all Pins 2A2D into a memory |

TABLE 2-continued

Look up table for messages with Activity-ID = 00000010

| Functional description of messages | Full Message ID | Activity-ID | Op-Code | Function ID | Example microprocessor action | Example Functions |
|---|---|---|---|---|---|---|
| Process Signal | 0000001000100001 | 00000010 | 0010 | 0001 | Command for block to process signal | Depending on input 2A-2D, the IC can emit new signal to Toggle Output |

In another embodiment, the message is a simple ON/OFF signal. In a further embodiment, the signal is a square wave and the duration of the square wave is adopted to indicate the operation instruction for the functional block to perform. In a specific embodiment, the button 1130 in FIG. 2 is connected to the peripheral module 202 of the power block 200 so that when a user presses the button 1130, the peripheral module 202 alters the microprocessor 201 of the power block 200. Microprocessor 201 then sends out a square wave signal to the message wires 205 for as long as the button 1130 is pressed. The square wave will then be transmitted to all the functional blocks connected to this cascaded building block system.

In a further embodiment and by way of an example, let the power system consists of a power block, a light block cascaded on top of the power block, a thermometer block and a Bluetooth block coupled to the light block respectively. Furthermore, this power system adopts the following message convention:
1. A three second square wave is interpreted as toggle the power ON/OFF
2. A two second square wave is interpreted by the Bluetooth module to start Bluetooth communication.
3. A one second square wave is for the thermometer block to turn on the LCD display to display temperature.

With this arrangement, when the user presses the button 1130 for a specific duration, the microprocessor 201 of the power block 200 generates the square wave for that specific duration and send along the message wires 205, and each functional block receiving the square ware message will perform the necessary operation mentioned above based on the duration of the square wave.

Example 2

Figure 5:
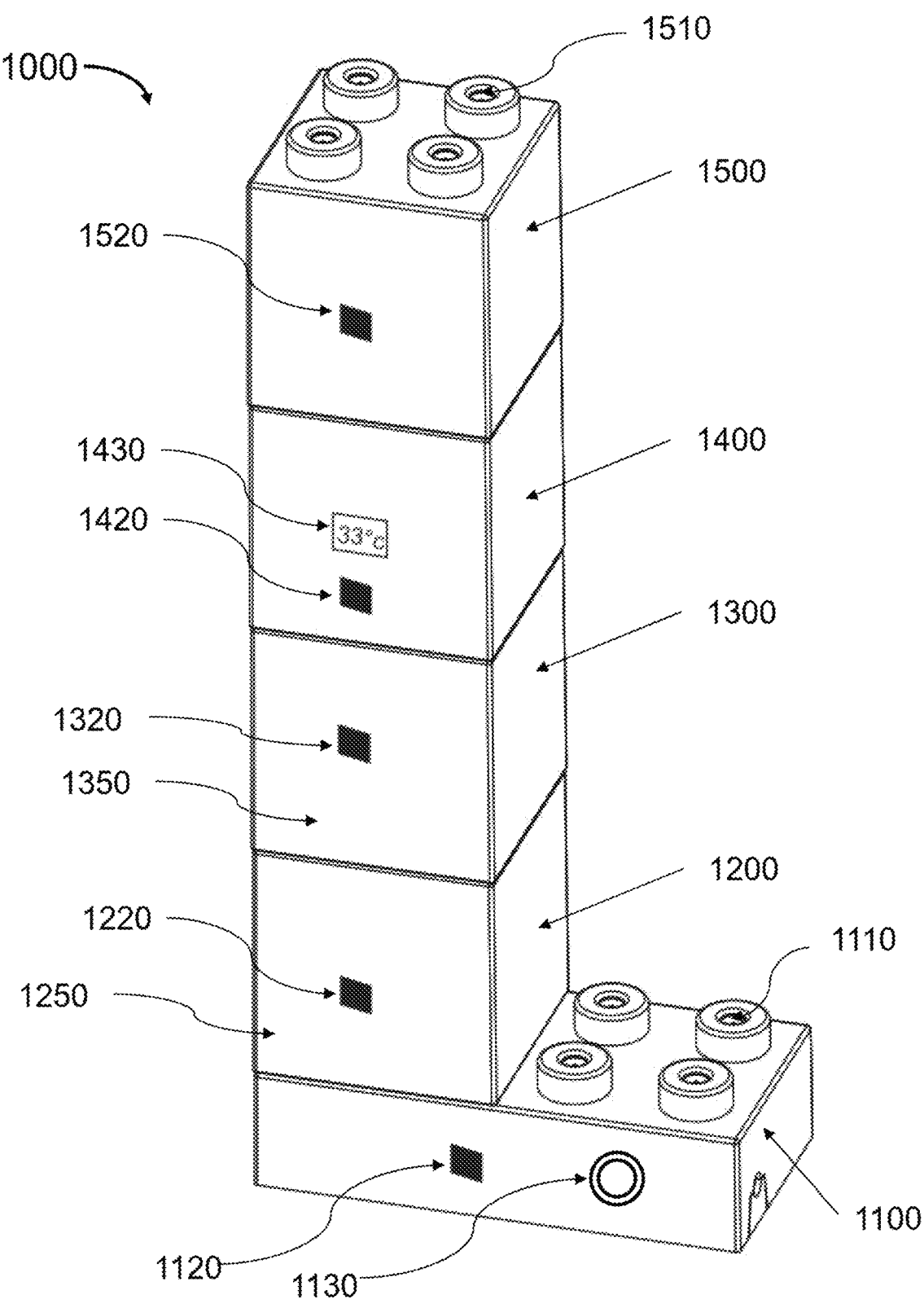
FIG. 5 is a perspective view of a cascaded building block system according to an example embodiment.

Referring now to FIG. 5 which shows an example embodiment of a cascaded building block system 1000. The cascaded building block system 1000 includes a plurality of blocks that are cascaded together. Each block includes a plurality of coupling members, and each block is connectable to at least one adjacent block through at least one of the coupling members. In this embodiment, the plurality of blocks of the cascaded building block system 1000 includes the power block 1100 as shown in FIG. 2, the functional block 1200 as shown in FIG. 3A (also referred to as the first functional block) cascaded on top of the power block 1100, a second functional block 1300 cascaded on top of the first functional block 1200, a third functional block 1400 cascaded on top of the second functional block 1300, and a fourth functional block 1500 cascaded on top of the third functional block 1400. For ease of description, the direction towards the fourth functional block 1500 is called "top", and the direction towards the power block 1100 is called "bottom".

In this embodiment, the power block 1100 is positioned at the bottom of the cascaded building block system 1000. The power block 1100 includes a power block microprocessor 1120, eight power block output coupling members 1110 and a control component 1130. The structure of the power block 1100 are already described in detail in FIG. 2. The power block 1100 controls and distributes the electrical power passing through each functional block of the cascaded building block system 1000 based on the messages sent by the power block 1100 via the power block output coupling members 1110.

In this embodiment, each of the first functional block 1200, the second functional block 1300, the third functional block 1400 and the fourth functional block 1500 comprises a plurality of coupling members (such as output coupling members 1510 of the fourth functional block 1500) for coupling with at least one adjacent functional block or power block for power transfer and message transfer, and a functional block microcomputer which serves as a message receiver that receives and interprets the messages from the power block 1100. In this embodiment, the first functional block 1200, the second functional block 1300, the third functional block 1400 and the fourth functional block 1500 include the functional block microcomputers 1220, 1320, 1420 and 1520 respectively. In some embodiments, each functional block may further include a peripheral module that performs a predetermined function in response to the signals.

By way of example, in this embodiment, the first functional block 1200 and the second functional block 1300 (also referred to as the light blocks) each includes a functional block housing 1250 and 1350 respectively, and a lighting module (not shown) housed within the functional block housing as the peripheral module. In some embodiments, the first functional block 1200 and the second functional block 1300 can be made of substantially transparent material or semi-transparent material so that light from the lighting module can be transmitted out from the functional block housing. In some embodiments, the lighting module may itself form the functional block housing 1250 and/or 1350. The functional block microcomputers 1220 and 1320 (also referred to as the light block microcomputers) receive the messages from the power block 1100 to switch the lighting modules of the corresponding functional blocks 1200 and 1300 on or off in response to the messages. In this embodiment, the third functional block 1400 (also referred to as the thermometer block) includes a thermometer (not shown) and a LCD display 1430. In some embodiments, the functional block microcomputer 1420 (also referred to as the thermometer block microcomputer) is configured to receive the messages from the power block 1100 to turn on or off the LCD display 1430 that is configured to display temperatures sensed by the thermometer. The fourth functional block 1500 (also referred to as the Bluetooth block) includes a Bluetooth device (not shown) that is configured to receive Bluetooth signals as the peripheral module. In some embodiments, the functional block microcomputer 1520 (also referred to as the Bluetooth block microcomputer) is configured to receive the messages from the power block 1100 to control the Bluetooth device to start or stop receiving the Bluetooth signals. In some embodiments, the Bluetooth module may communicate with other Bluetooth devices external to this cascaded building block system 1000.

In some embodiments, the messages sent by the power block 1100 controls the electrical power passing through all the functional blocks of the cascaded building block system as well as control each of the functional blocks to perform a specific operation. As mentioned in previous paragraphs, each message is drawn from a plurality of message-patterns which are unique and carry a unique operational code for the functional block to execute. For example, the message-pattern sent by the power block 1100 may carry the operation code which instructs the functional block microcomputer to cut off the electrical power going through the output coupling members of the functional block 1400 if the temperature detected by the thermometer is below 15° C. When the functional blocks 1200, 1300, 1400 and 1500 receive the message, each of them examines if the message-pattern in the received message is the same as the at least one message-pattern that it is configured to respond. As only thermometer block 1400 contains a thermometer, it will respond to the message and perform the operation specified by the message-pattern. On the other hand, the other functional blocks 1300, 1400 and 1500 ignores the message, as the message is not directed to them. As a result, when the condition is met (i.e. temperature detected is below 15° C.), the electrical power will not go through the output coupling members of the thermometer block 1400 to the Bluetooth block 1500 on top, which essentially cut off the power of the Bluetooth block 1500 above.

Example 3

Figure 6:
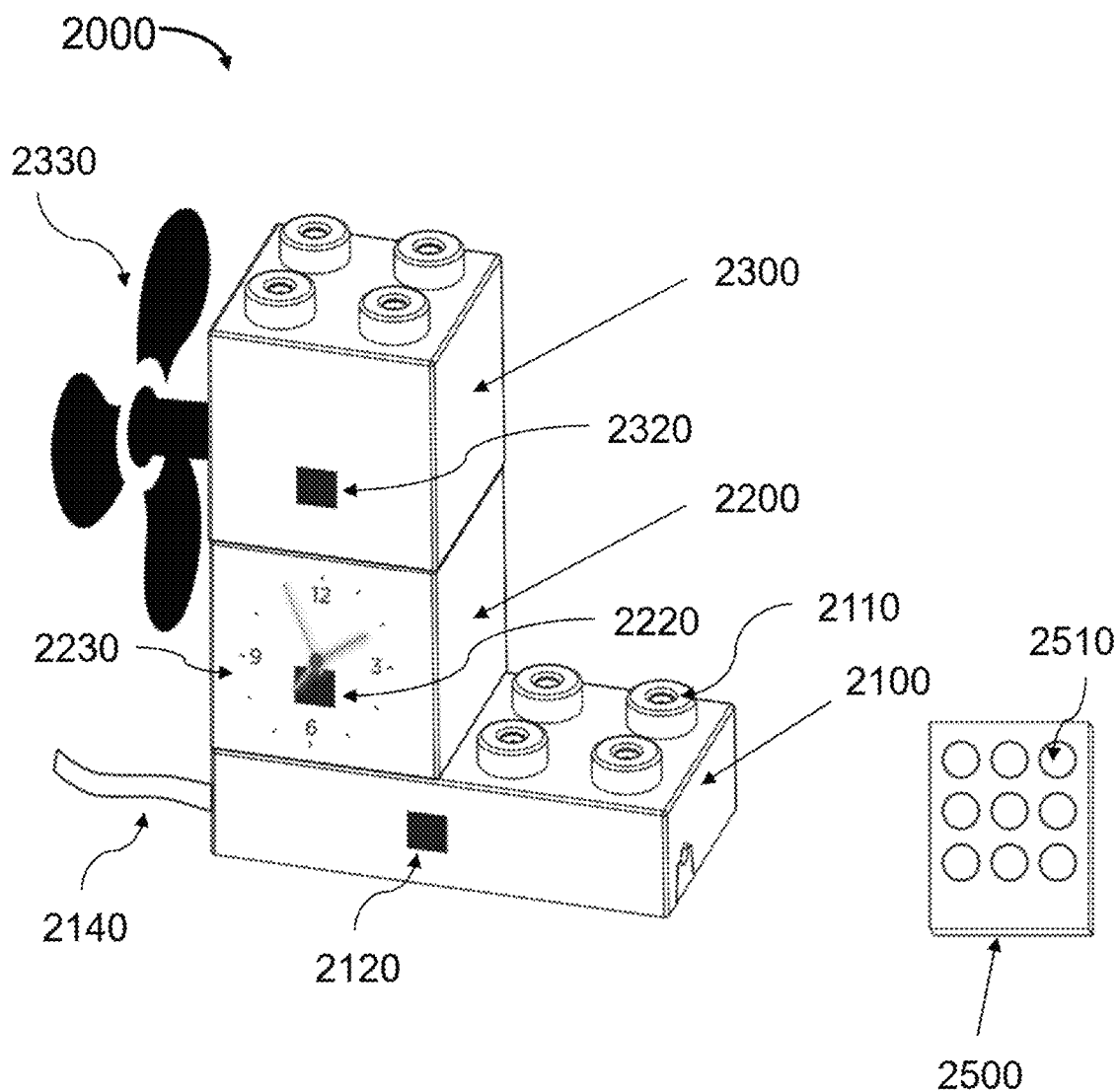
FIG. 6 is a perspective view of a cascaded building block system according to another example embodiment.

Referring now to FIG. 6, another embodiment of the cascaded building block system 2000 includes a plurality of blocks with various functions that are cascaded together and connected with each other through the coupling members. In this embodiment, the plurality of blocks of the cascaded building block system 2000 includes a power block 2100, a first functional block 2200 cascaded on top of the power block 2100 and a second functional block 2300 cascaded on top of the first functional block 2200. In this embodiment, the cascaded building block system 2000 further includes a remote controller 2500 configured to send wireless signals to the power block 2100 to control the message-pattern sent by the power block 2100 of the cascaded building block system 2000 remotely. The remote controller 2500 includes a plurality of remote control buttons 2510. In some embodiments, each of the remote control button 2510 is configured to send a specific wireless signal to the power block 2100 which is translated to a specific message-pattern to be generated and sent by the power block 2100.

In this embodiment, the power block 2100 is positioned at the bottom of the cascaded building block system 2000. The power block 2100 includes a power block microcomputer 2120, eight power block output coupling members 2110 (only four coupling members are shown here in FIG. 6), and a wireless receiver antenna 2140 that is connected with the power block microcomputer 2120. The wireless receiver antenna 2140 is configured to receive the wireless signals sent by the remote controller 2500 and pass the wireless signals to the wireless remote control receiver module (not shown) in power block microcomputer 2120. In some embodiments, the power block microcomputer 2120 is configured to generate messages based on the specific wireless signals received. The power block output coupling members 2110 is configured to pass electrical power and the messages. The power block 2100 controls the electrical power passing through each functional block of the cascaded building block system 2000 through the messages sent from the power block 2100 via the power block output coupling members 2110.

In this embodiment, the first functional block 2200 connects with the power block 2100 through the coupling of the power block output coupling members 2110 with the corresponding input coupling members (not shown) of the first functional block 2200. The first functional block 2200 (also referred to as the timer block) includes a timer 2230 as the peripheral module and a timer block microcomputer 2220. In some embodiments, the timer 2230 is a clock. The second functional block 2300 connects with the first functional block 2200 through the coupling of the output coupling members (not shown) of the first functional block 2200 and the corresponding input coupling members (not shown) of the second functional block 2300. The second functional block 2300 (also referred to as the fan block) includes a fan 2330 as the peripheral module and a fan block microcomputer 2320.

In some embodiments, a message can be sent from the power block 2100 which instructs the timer block microcomputer 2220 to allow electrical power to pass through one or more adjacent functional blocks positioned above (for example, in this embodiment, the fan block 2300 that is cascaded on top the timer block 2200) within a predetermined time as set by the timer 2230. The predetermined time can be set by a user by manually adjusting the timer 2230.

In one embodiment, a message can be sent from the power block 2100 which instructs the fan block microcomputer 2320 to control a power supplying to the fan 2330. In another embodiment, a message can be sent from the power block 2100 which instructs the fan block microcomputer 2320 to control a speed of the fan 2330.

By way of example, when one of the remote control button 2510 is pressed by a user, the remote controller 2500 is configured to send a specific wireless signal to the power block 2100. The power block microcomputer 2120 is configured to generate a message with a unique Full Message ID (also referred to as a message-pattern) based on the specific wireless signal received. The timer block microcomputer 2220 and the fan block microcomputer 2320 receive the message with the specific Full Message ID to examine if they are configured to respond to the specific Full Message ID by performing a specific operation or to ignore it. For example, the following messages with the Full Message ID in Table 3 below can be sent by the power block microcomputer 2120 to the timer block microcomputer 2220 and the fan block microcomputer 2230 to turn on the fan 2330 at a pre-set speed of 2, and turn off the fan 2330 after a predetermined time set by the user by adjusting the timer 2230.

TABLE 3

Examples of messages with the Full Message ID and the corresponding functions

| Functional description of messages | Full Message ID (Activity ID-Op code-Function ID) | Example Functions |
|---|---|---|
| Timer Block ON/OFF | 00000001-1110-0000 | This will permit power to always go through the output coupling pins of the timer block 2200 (Toggle ON), or to always block the power to go through the output coupling pins of the timer block 2200 (Toggle OFF) |
| Press/Pin Timer to set a pre-determined time | 00000001-1110-0001 | This will allow the timer 2230 to control the power output of the output coupling pins, permitting the user to adjust the timer 2230 to set a predetermined time in which power will pass through the fan block 2300 and the fan 2330 will be turned ON |
| Fan ON/OFF | 00000001-1100-0000 | That will permit power to go to the fan 2330 |
| Fan Speed 2 | 00000001-1100-0010 | This will change the speed of the fan 2330 to a pre-set speed of 2 |

Example 4

Figure 7:
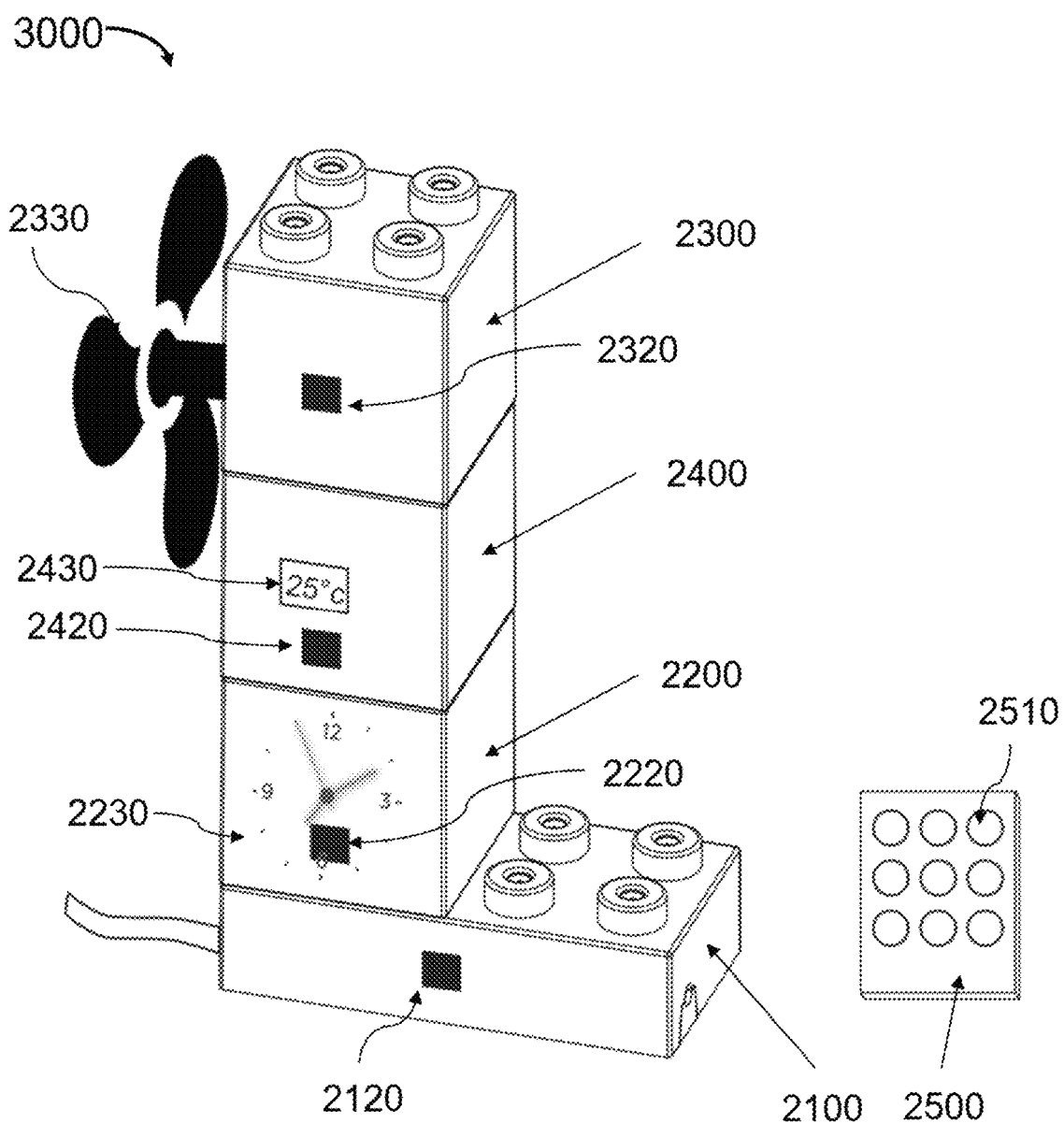
FIG. 7 is a perspective view of a cascaded building block system according to another example embodiment.

FIG. 7 shows a cascaded building block system 3000, which is the same example embodiment of the cascaded building block system 2000 as shown in FIG. 6 with an additional, third functional block 2400 added to the cascaded building block system. In this embodiment, the cascaded building block system 3000 includes the power block 2100 positioned at the bottom, the first functional block 2200 cascaded on top of the power block 2100, the third functional block 2400 cascaded on top of the first functional block 2200, the second functional block 2300 cascaded on top of the third functional block 2300, and a remote control 2500. In other words, compared to the cascaded building block system 2000 as shown in FIG. 6, the cascaded building block system 3000 in this embodiment includes the third functional block 2400 added in between the first functional block 2200 and second functional block 2300.

The third functional block 2400 (also referred to as the thermometer block) includes a thermometer (not shown) and a LCD display 2430 as the peripheral modules, and a thermometer block microcomputer 2420. The thermometer is configured to detect a surrounding temperature. In some embodiments, the thermometer block microcomputer 2420 is configured to receive the messages from the power block 2100 to turn on or off the thermometer and/or the LCD display 2430 that is configured to display the surrounding temperature detected by the thermometer. In some embodiments, the thermometer is operably coupled to the thermometer block microcomputer 2420. In some embodiments, a message can be sent from the power block 2100 which instructs the thermometer block microcomputer 2420 to check whether the surrounding temperature detected is greater than a predetermined temperature, and if so, to allow electrical power and the messages to pass through each output coupling member (not shown) of the third functional block 2400 to the adjacent second functional block 2300 (i.e. the fan block) positioned above, therefore adding a temperature control function to the fan block of the cascaded building block system 3000.

By way of example, when one of the remote control button 2510 is pressed by a user, the remote controller 2500 is configured to send a specific wireless signal to the power block 2100. The power block microcomputer 2120 is configured to generate a signal with a unique Full Message ID based on the specific wireless signal received. The timer block microcomputer 2220, the thermometer block microcomputer 2420 and the fan block microcomputer 2320 are configured to receive the messages with the specific Full Message ID to control a power supply to the timer 2230, the thermometer and/or the LCD display 2430, and the fan 2330 respectively. For example, the following messages with the Full Message ID in Table 4 below can be sent by the power block microcomputer 2120 to the timer block microcomputer 2220, the thermometer block microcomputer 2420 and the fan block microcomputer 2230 to turn on the fan 2330 at a pre-set speed of 2 when the surrounding temperature detected is greater than a predetermined temperature, and turn off the fan 2330 after a predetermined time set by the user by adjusting the timer 2230.

TABLE 4

Examples of messages with the Full Message ID and the corresponding functions

| Functional description of messages | Full Message ID (Activity ID-Op code-Function ID) | Example Functions |
|---|---|---|
| Timer Block ON/OFF | 00000001-01110-000 | This will permit power to always go through the output coupling pins of the timer block 2200 (Toggle ON), or to always block the power to go through the output coupling pins of the timer block 2200 (Toggle OFF) |
| Press/Pin Timer to set a pre-determined time | 00000001-1110-0001 | This will allow the timer to control the power output of the output coupling pins, permitting the user to adjust the timer 2230 to set a predetermined time in which power will pass through the fan block 2300 and the fan 2330 will be turned ON |
| ON/OFF thermometer control | 00000001-0101-0000 | This will permit power to pass through the fan block 2330 under temperature control condition. |
| Control Thermometer Output above a preset temperature | 00000001-0101-0001 | This will permit power to go to the fan block 2330 above the thermometer block 2430 when the surrounding temperature detected is greater than a predetermined temperature |
| Fan ON/OFF | 00000001-1100-0000 | That will permit power to go to the fan 2330 |
| Fan Speed 2 | 00000001-1100-0010 | This will change the speed of the fan 2330 to a pre-set speed of 2 |

Example 5

Figure 8:
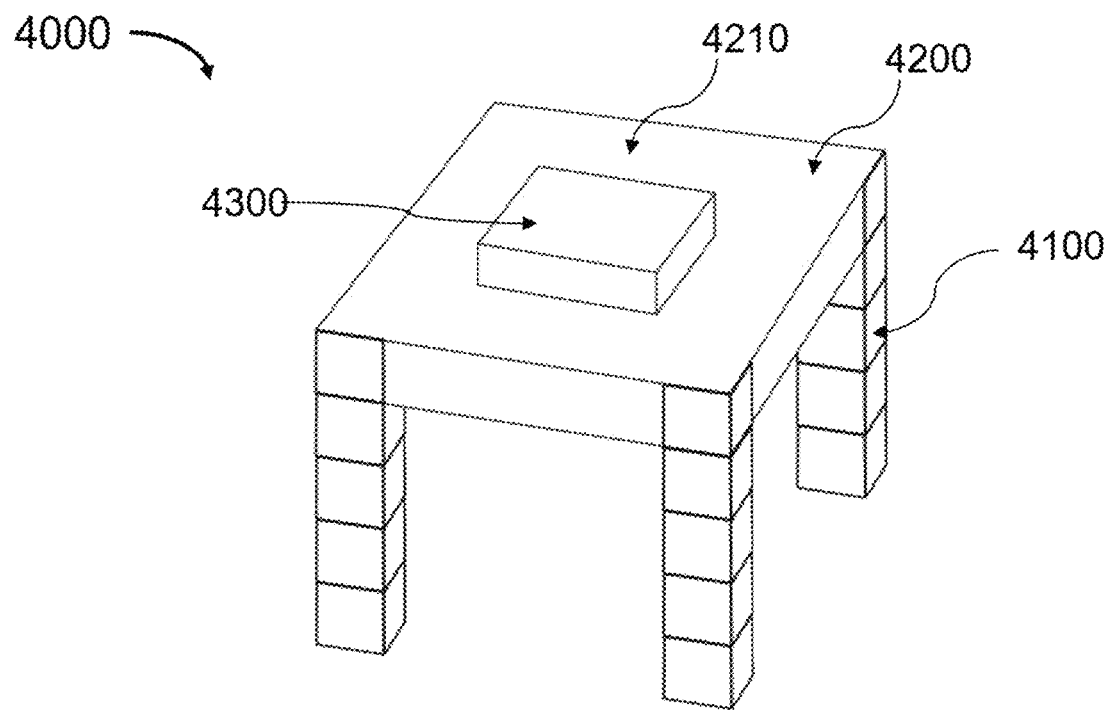
FIG. 8 is a schematic perspective view of a cascaded building block system comprises a plurality of blocks that forms a shape of a desk according to an example embodiment.

FIG. 8 shows a cascaded building block system 4000 according to another example embodiment. In this embodiment, the cascaded building block system 4000 includes a plurality of blocks that are cascaded together through the coupling members (not shown) to form a shape of a desk. In this embodiment, the cascaded building block system 4000 includes a plurality of blocks 4100 that are cascaded together to form legs of the desk, and a top block 4200 that forms a top of the desk that are supported by the legs. The top block 4200 has a top surface 4210 and a plurality of output coupling members (not shown) disposed on the top surface 4210. In some embodiments, the top block 4200 has a different dimension that forms the flat surface of the desk and at least one of the blocks 4100 is a power block, while the rest of the blocks 4100 and the top block 4200 are functional blocks. In some embodiments, the top block 4200 also has output coupling members (not shown) so that an additional block 4300 with input coupling members that can be removably connected with the output coupling members of the top block 4200. As such, electrical power and messages can be transferred from the top block 4200 to the additional block 4300. The additional block 4300 may include an electronic module as the peripheral module, such as Wifi router module, speaker module, or other home appliance or home entertainment module. In some embodiments, the additional block 4300 includes a Wifi router module. A user can move the additional block 4300 to any preferred location above the top block 4200 and connect the additional block 4300 with the output coupling members of the top block 4200 at the preferred location. In such case, the user can easily relocate the additional block 4300, and electrical power will be supplied when the additional block 4300 is connected with the top block 4200 without the need to worry about wirings or locations of wall plugs in a room for external power supply for the additional block 4300 itself.

Example 6

Figure 9:
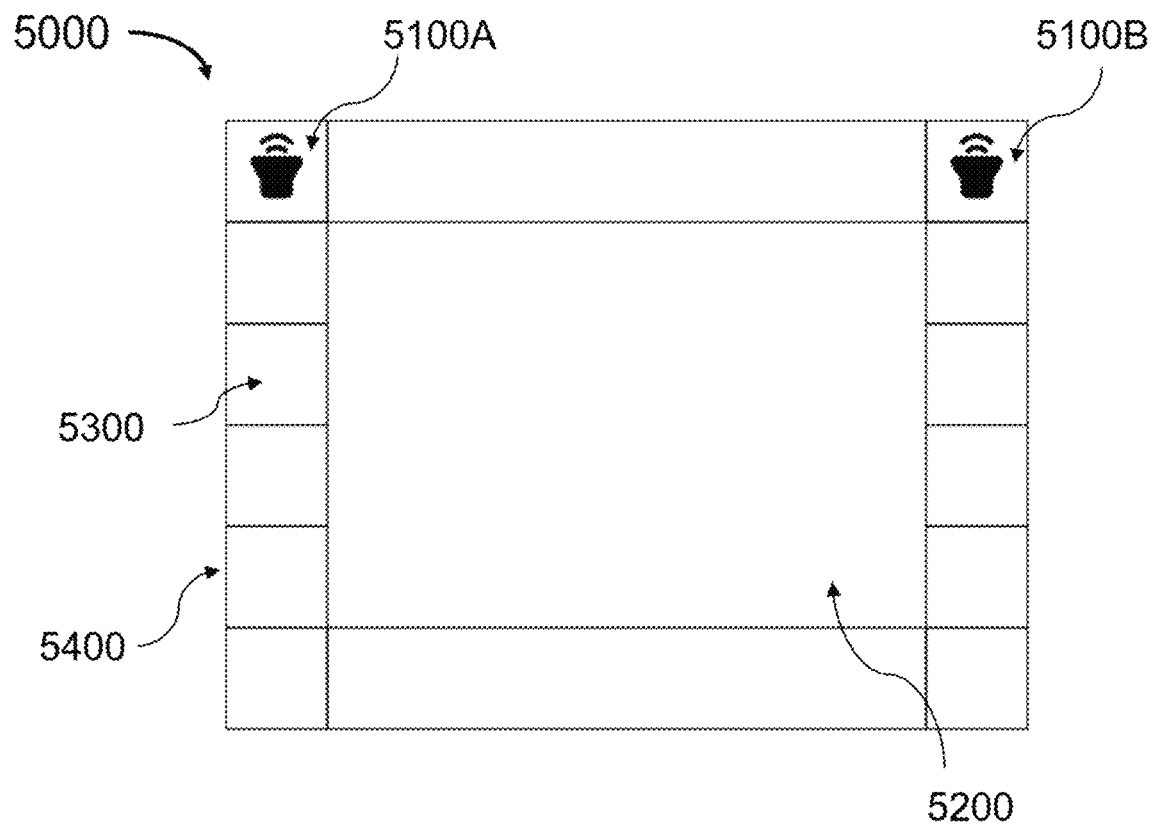
FIG. 9 is a schematic top view of a cascaded building block system according to an example embodiment.

FIG. 9 shows a top view of a cascaded building block system 5000 according to another example embodiment. In this embodiment, the cascaded building block system 5000 includes a display block 5200 and a plurality of functional blocks 5300 that are surrounding the display block 5200 and directly/indirectly connected with each other as well as with the display block 5200 through the coupling members (not shown), forming a top layer 5400 of the cascaded building block system 5000. In some embodiments, there are one or more layers of functional blocks (not shown) positioned beneath the top layer 5400 that are connected with the functional blocks 5300 and display block 5200 through the coupling members to provide electrical power to each functional block in the top layer 5400 as well as to provide physical support to the top layer 5400. The cascaded building block system 5000 includes a power block (not shown), which controls electrical power passing through each functional block of the cascaded building block system 5000 through the messages sent from the power block. Optionally, the cascaded building block system 5000 may further include two functional blocks 5100A and 5100B that are connectable with the display block 5200 or one or more of the blocks 5300. Each of the functional blocks 5100A and 5100B may include an electronic module as the peripheral module, such as Wifi router module, speaker module, or other home appliance or home entertainment module. In this embodiment, the functional blocks 5100A and 5100B (also referred to as speaker blocks) include speakers as the peripheral modules. The speaker blocks 5100A and 5100B are not fixed at a predetermined position but can be connected to and/or interchanged with any functional blocks 5300 in any location within the cascaded building block system 5000 according to user's preference to produce an optimal sound effect. In some embodiments, the speakers in the speaker blocks 5100A and 5100B coordinate with the display block 5200 to synchronize audio (from the speakers) and video (from the display block) via any means of communication that can be configured between them. Such configuration provides a high flexibility to move the position of any blocks within the cascaded building block system and to add/ remove any individual blocks with different peripheral modules to produce a cascaded building block system with a variety of modular functions.

In a further embodiment, the cascaded building block system 5000 is the top block 4200 as shown in FIG. 8. This illustrates that a cascaded building block system can be built on top of another cascaded building block system. This approach offers much flexibility to users to add functional block gadgets to his/her system as and when they want, and to re-configure the placements of functional block gadgets to suit a particular event (such a birthday celebration).

Example 7

Figure 10:
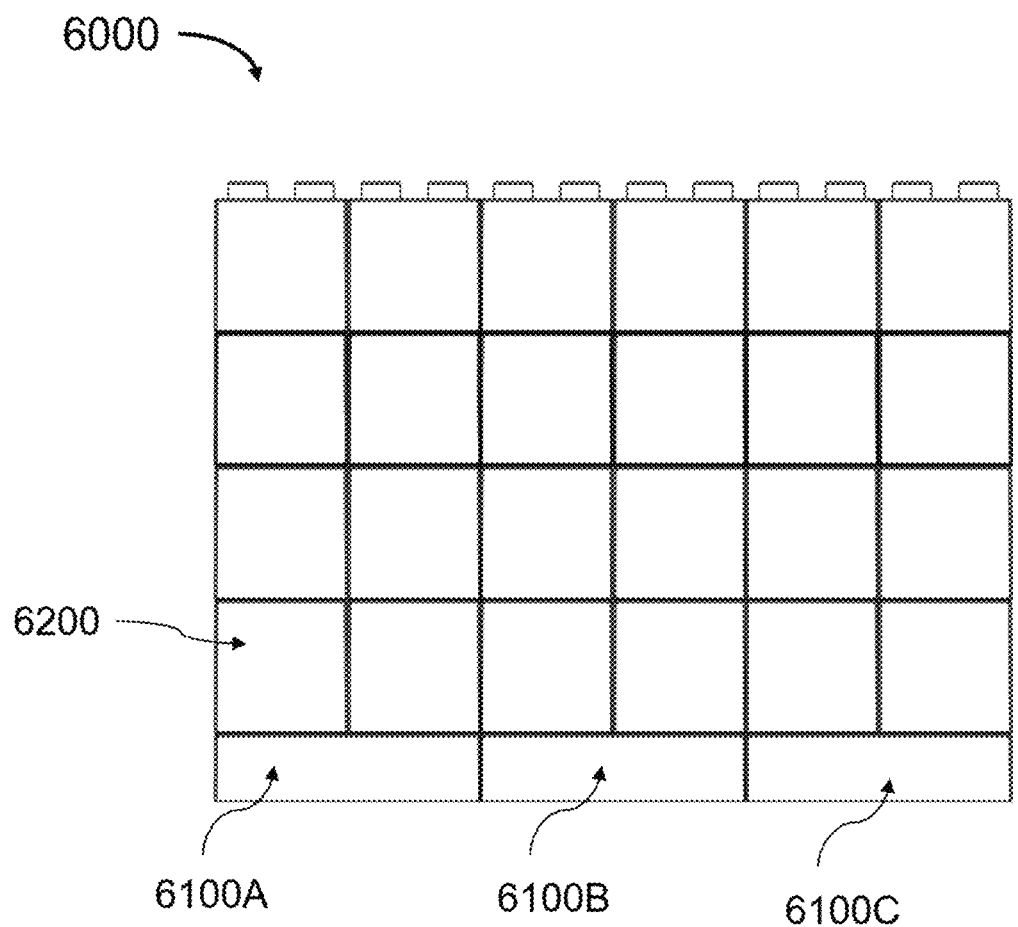
FIG. 10 is a schematic front view of a cascaded building block system including three power blocks that are cascaded with each other according to an example embodiment.

FIG. 10 shows a cascaded building block system 6000 according to another example embodiment. In this embodiment, the cascaded building block system 6000 includes three power blocks 6100A, 6100B and 6100C that are combined and cascaded to supply higher power to a plurality of functional blocks 6200 that are cascaded above the three power blocks 6100A, 6100B and 6100C. As the current from each of the power blocks 6100A, 6100B and 6100C will be combined to supply a higher power when they are connected to each other, this ensures that the cascaded building block system 6000 maintains its efficiency and meets the power consumption requirement when the loading of the functional blocks 6200 in the cascaded building block system 6000 requires a higher power consumption. By way of example, the combination of all the functional blocks 6200 in the cascaded building block system 6000 may require 12V supply voltage and current load of 2.5 A (12V/2.5 A), while each power block may only supply a power output of 12V voltage and current of 1 A (12V/1 A), which is insufficient to meet the total power consumption requirement of the system. By connecting three power blocks 6100A, 6100B and 6100C together, the power of each power block can be combined and cascaded to supply a total power output of 12V voltage and current of 3 A (12V/3 A) sufficient to meet the total power consumption requirement. [Inventor, please confirm if our understanding is accurate] In some embodiments, one or more extra power blocks may further be added to ensure the cascaded building block system maintain its efficiency and meet the power consumption requirement.

How the Messages Control the Power Distribution of the Functional Blocks in the Cascaded Building Block System Now turning to example embodiments of the operation of the cascaded building block system as described above. The following examples demonstrates how the messages sent from the power block to the functional block control the transfer of electrical power within the functional blocks in the power block system through coupling of the output coupling members of one functional block with the input coupling members of another adjacent functional block.

Example 8

Figure 11:
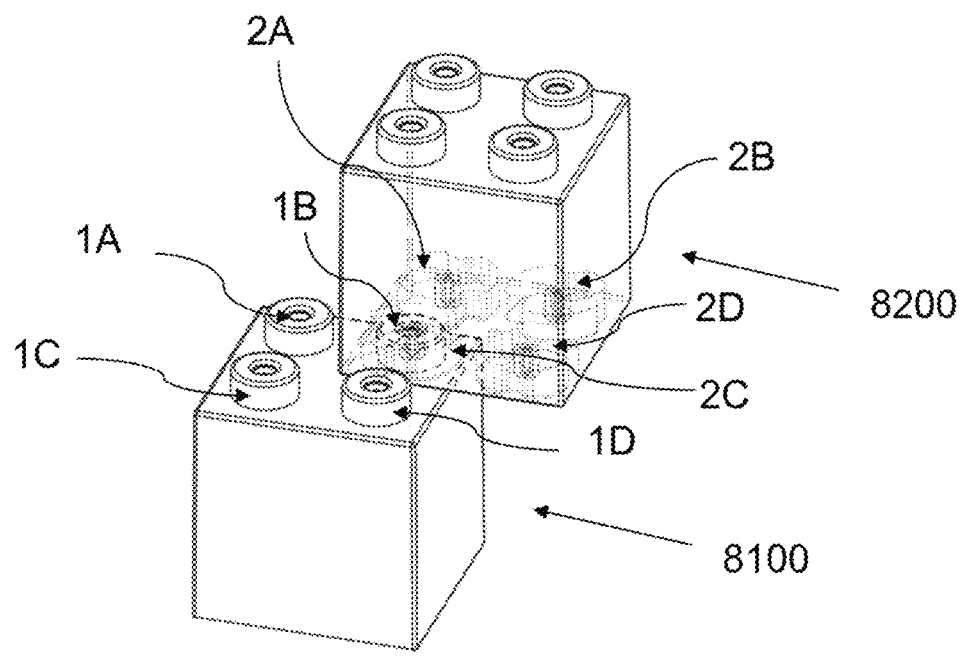
FIG. 11 shows two functional blocks connected together via the coupling members according to an example embodiment.

Referring now to FIG. 11, which shows a first functional block 8100 and a second functional block 8200 that are connected with each other. Although not shown in FIG. 11, it is understood that the first functional block 8100 is directly or indirectly connected with a power block (not shown) in a cascaded building block system. In this embodiment, the structures of the first functional block 8100 and the second functional block 8200 are generally the same as the structure of the functional block 1200 as described in FIGS. 3A and 3B above. Each functional block includes four output coupling members disposed on one side, and four input coupling members (not shown) disposed on an opposite side (not shown). For ease of description, the four output coupling members of each functional block are referred to as output coupling members 1A, 1B, 1C and 1D respectively, and the four input coupling members of each functional block is referred to as input coupling members 2A, 2B, 2C and 2D respectively.

In this embodiment, the first functional block 8100 and the second functional block 8200 are connected with each other through the coupling of the output coupling member 1B of the first functional block 8100 and the input coupling member 2C of the second functional block 8200. By way of example, the power block microcomputer of the power block (not shown) is configured to generate messages with unique message-pattern (a Full Message ID). When a message is generated and transmitted to the first functional block 8100, the functional block microcomputer of the first functional block 8100 receives the message, examines if the message-pattern in the received message is the same as the at least one message-pattern that the first functional block 8100 is configured to respond, and if so, controls the electrical power passing through each output coupling member of the first functional block 8100 in response to the particular message. Therefore, a message which includes an operational code to trigger output coupling member 1B of the first functional block 8100 to toggle can be generated, thereby effectively controlling power passing to the adjacent second functional block 8200. For example, the following message-pattern with the Full Message ID in Table 5 below can be sent by the power block microcomputer to control power passing through the second functional block 8200.

TABLE 5

Example of message with the Full Message ID and the corresponding function

| Functional description of message | Full Message ID (Activity ID-Op code-Function ID) | Example Function |
| --- | --- | --- |
| Toggle 1B Output | 00000010-1000-0010 | Functional block microcomputer of the first functional block 8100 will take command and trigger the output coupling member 1B of the first functional block 8100 to toggle between the DISCONNECT and CONNECT state. If the output coupling member 1B is CONNECT, it will now become DISCONNECT in response to the message, causing the second functional block 8200 to be out of power. |

Example 9

Figure 12:
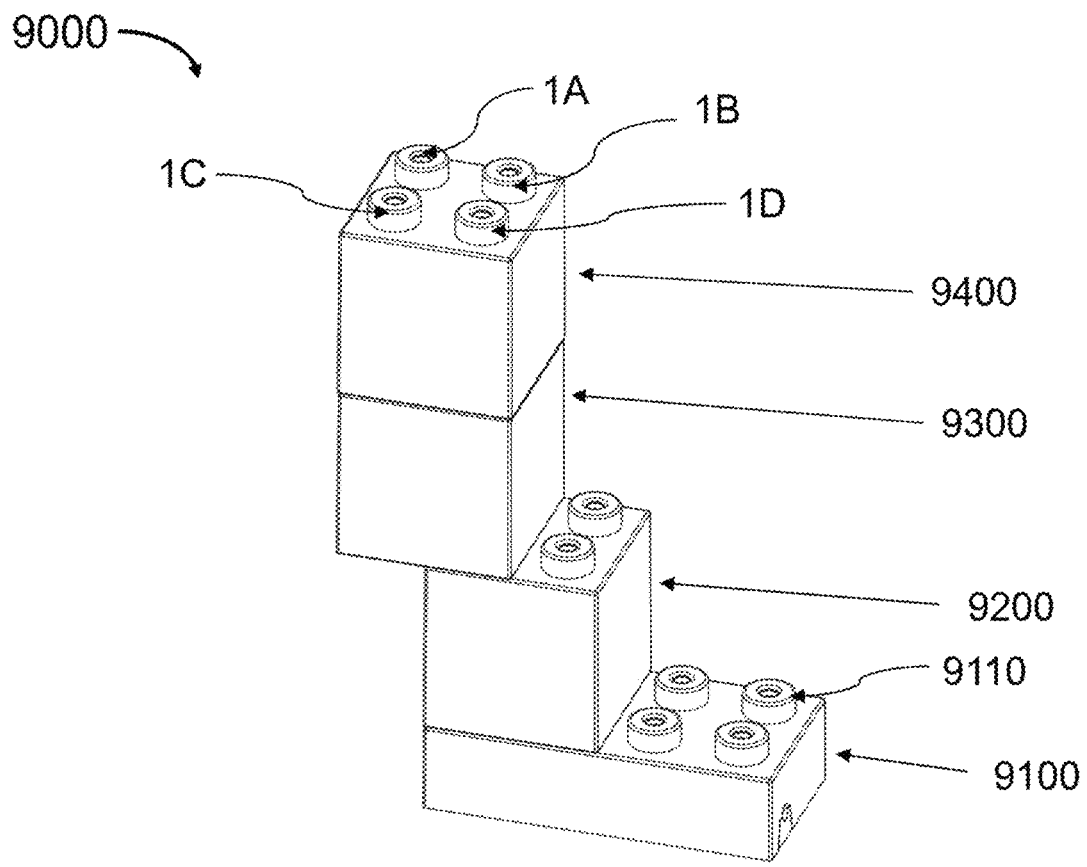
FIG. 12 is a perspective view of a cascaded building block system according to an example embodiment.

FIG. 12 shows another example embodiment of a cascaded building block system 9000, including a power block 9100 positioned at the bottom, a first functional block 9200 cascaded on top of the power block 9100, a second functional block 9300 cascaded on top of the first functional block 9200, and a third functional block 9400 cascaded on top of the second functional block 9300. In this embodiment, the structures of the functional blocks 9100, 9200 and 9300 are generally the same as the structures of the functional blocks as described in FIGS. 3A and 3B above. For ease of description, similar to FIG. 11 as described above, the four output coupling members of each functional block are referred to as output coupling members 1A, 1B, 1C and 1D respectively, and the four input coupling members of each functional block is referred to as input coupling members 2A, 2B, 2C and 2D (not shown) respectively. Some input/output coupling members are not shown in the figure, but it is understood that they are present in the same configuration as the functional block 8200 as shown in FIG. 11.

In this embodiment, the first functional block 9200 are connected with the power block 9100 through the coupling of the power block coupling members 9110 of the power block 9100 and the input coupling members of the first functional block 9200. The first functional block 9200 and the second functional block 9300 are connected with each other through the coupling of the output coupling members 1A and 1C (not shown) of the first functional block 9200 and the input coupling members 2B and 2D (not shown) of the second functional block 9300. The second functional block 9300 and the third functional block 9400 are connected with each other through the coupling of the output coupling members 1A-1D (not shown) of the second functional block 9300 and the input coupling members 2A-2D (not shown) of the third functional block 9400.

In some embodiments, the specific arrangement of the connections between the output coupling members of one functional block with the input coupling members of an adjacent functional block will affect the transfer of electrical power between the blocks in response to a message sent by the power block. By way of example, in the cascaded building block system 9000 as shown in FIG. 12, the power block microcomputer of the power block 9110 may generate the following messages with the Full Message ID in Table 6 below. The power block microcomputer may send a message ("Capture All Input" in Table 4) to instruct the functional block microcomputers of all the functional blocks to capture messages received from the input coupling members. By way of example, when a message of "Toggle 1B Output" or "Toggle 1C Output" is received by all the functional blocks from the input coupling members, the events as described in Table 6 below will be triggered.

TABLE 6

Examples of messages with the Full Message ID and the corresponding functions

| Functional description of messages | Full Message ID (Activity ID-Op code-Function ID) | Example Functions |
| --- | --- | --- |
| Capture All Input | 00000010-0010-0000 | Capture power and messages received from all of the input coupling members |
| Toggle 1B Output | 00000010-1000-0010 | Functional block microcomputers of all functional blocks (Activity ID 00000010) will take command and trigger the output coupling member 1B to toggle. If the output coupling member 1B is ON, it will turn OFF in response to the message. |
| Toggle 1C Output | 00000010-1000-0011 | Functional block microcomputers of all functional blocks (Activity ID 00000010) will take command and trigger the output coupling member 1C to Toggle. If output coupling member 1C is ON, it will turn OFF in response to the message. |

The exemplary embodiments of the present invention are thus fully described. Although the description referred to particular embodiments, it will be clear to one skilled in the art that the present invention may be practiced with variation of these specific details. Hence this invention should not be construed as limited to the embodiments set forth herein.

For example, the functional block microcomputer and/or the power block microcomputer may comprise a central processing unit (CPU), read only memory (ROM) and random-access memory (RAM) and other necessary circuitry to control and monitor a peripheral module. The ROM stores a dedicated set of programming instructions specifically developed for this functional block or power block. For the functional block, this set of instructions is configured to receive and examine the messages sent by the power block; compare it against stored message-patterns in ROM. If it matches, then this microcomputer will respond to this message. Otherwise, it will ignore the message.

For example, the power block housing and the functional block housing are described as having a generally rectangular shapes in example embodiments above, but other shapes may also be used, such as cube, cuboid, cylinder, cone, frusto-conical shape, square-based pyramid, square-based frusto-pyramid, pentagonal pyramid, pentagonal frusto-pyramid, hexagonal pyramid, hexagonal frusto-pyramid, triangular prism, hexagonal prism, and other polygonal shapes and non-polygonal shapes.

Functional blocks and power blocks discussed within different figures can be added to or exchanged with functional blocks and power blocks in other figures. Further, specific numerical data values (such as specific quantities, numbers, categories, etc.) or other specific information should be interpreted as illustrative for discussing example embodiments. Such specific information is not provided to limit example embodiment.

What is claimed is:

1. A cascaded building block system, comprising
    (a) at least one power block comprising:
        (i) an electrical power generator that provides electrical power;
        (ii) a microcomputer that generates messages; and
        (iii) at least one output coupling member that outputs the electrical power and the messages;
    (b) at least one functional block releasably coupled to the power block or to at least one adjacent functional block, each functional block comprises:
        (i) at least one input coupling member and at least one output coupling member, wherein the at least one input coupling member is connectable to the at least one output coupling member of the power block or to at least one output coupling member of an adjacent functional block to receive and transfer the electrical power and the messages;
        (ii) a microcomputer that receives and interpret the messages sent by the power block;
        (iii) a power distribution module controllable by the microcomputer to distribute the electric power to the at least one output coupling member; and
        (iv) a peripheral module receiving instructions from the microcomputer to perform specific function for the functional block;
    wherein the power block controls and distributes the electrical power to each of the functional blocks via the messages sent by the power block, and
    wherein the power distribution module of the functional block further comprises a plurality of power regulator modules, each of the power regulator module connected to the input coupling member for receiving the electric power and the messages at one end and to the output coupling member at the other end, wherein upon receiving instruction from the microcomputer of the functional block, the power distribution module causes a specific power regulator module to change an electric power output status of a specific output coupling member between a disconnect state and a connect state.

2. The cascaded building block system of claim 1, wherein the at least one power block further comprises a power distribution module controllable by the microcomputer to distribute the electric power to the at least one output coupling member.

3. The cascaded building block system of claim 1, wherein each input coupling member has a shape of a notch and each output coupling member has a shape of a stud that is complementary to the shape of the notch, wherein the input coupling member comprises a first set of conducting plates attached to the notch and the output coupling member comprises a second set of conducting plates attached to the stud, such that when a first block is physically connected to a second block, the stud of the first block is firmly inserted into the notch of the second block so that the first set of the conducting plates is reliably contacting the second set of conducting plates causing the electric power and the messages to flow from the first block to the second block, wherein the first block is the power block or the functional block and the second block is a different functional block.

4. The cascaded building block system of claim 1, wherein each message generated by the power block is drawn from a plurality of message-patterns; each message-pattern is unique and carries a unique operational code for the functional block to execute.

5. The cascaded building block system of claim 4, wherein each functional block is configured to interpret and process at least one message-pattern, and when a functional block receives a message, the functional block is configured to:
    (a) examine if the message-pattern in the received message is the same as the at least one message-pattern that the functional block is configured to respond;
    (b) perform an operation specified by the message-pattern if the message-pattern is the same as the at least one message-pattern that the functional block is configured to respond; and
    (c) ignore the message if the message-pattern is different from the at least one message-pattern that the functional block is configured to respond.

6. The cascaded building block system of claim 5, wherein the message-pattern comprises a sequence of binary digits, wherein the sequence of binary digits is partitioned into an action-ID field, an Op-code and a function-ID field.

7. The cascaded building block system of claim 6, wherein the sequence of binary digits is sixteen bits long; the action-ID field is eight bits long, the Op-code is four bits long and the function-ID field is four bits long.

8. The cascaded building block system of claim 4, wherein the message-pattern is a duration of a square wave, and wherein different duration carries different operational code for the functional block to execute.

9. The cascaded building block system of claim 1, wherein the message generated by the power block includes instruction for the microcomputer of the functional block to instruct the specific power regulator module to change the electric power output status.

10. The cascaded building block system of claim 1, wherein when a sensor in the peripheral module of the functional block microcomputer detects an abnormal reading, the microcomputer issues instruction to instruct the specific power regulator module to change the electric power output status.

11. A method of controlling a distribution of electric power in a cascaded building block system, wherein the cascaded building block system comprises at least one power block and at least one functional block that is releasably coupled to the power block or an adjacent functional block, wherein each functional block comprises at least one input coupling member, at least one output coupling member, a microcomputer and a power distribution module, wherein the at least one input coupling member of the functional block can receive the electric power and messages reliably from at least one output coupling member of the power block or another functional block, wherein the power distribution module further comprises a plurality of power regulator modules, each of the power regulator module connected to the input coupling member for receiving the electric power and the messages at one end and to the output coupling member at the other end, comprising:
- providing, by the power block, the electric power;
- generating, by a microcomputer in the power block, the messages;
- receiving, by at least one input coupling member of a functional block, the electric power and the messages;
- interpreting, by the microcomputer in the functional block, the received message; and
- controlling, by the power distribution module, a specific power regulator module to change an electric output power status of a specific output coupling member of the functional block between a disconnect state and a connect state upon receiving instruction from the microcomputer of the functional block based on the interpretation of the received message.

12. The method of claim 11, further comprising:
- distributing, by the power distribution module controllable by the microcomputer in the power block, the electric power and the messages to at least one output coupling member of the power block.

13. The method of claim 11, wherein each message is drawn from a plurality of message-patterns; each message-pattern is unique and carries a unique operational code for the functional block to execute and each functional block is configured to interpret and process at least one message-pattern, further comprising
- examining, by the functional block, if the message-pattern in the received message is the same as the at least one message-pattern that the functional block is configured to respond; and
- performing, by the functional block, an operation specified by the message-pattern if the message-pattern is the same as the at least one message-pattern that the functional block is configured to respond.

14. The method of claim 11, further comprising
- adding one or more power block to the cascaded building block system to increase a power output capacity of the cascaded building block system when needed.

* * * * *